United States Patent
Subramanian et al.

(10) Patent No.: US 9,998,939 B2
(45) Date of Patent: Jun. 12, 2018

(54) TRANSMISSIONS FOR WEARABLE DEVICES

(71) Applicant: QUALCOMM Incorporated, San Diego, CA (US)

(72) Inventors: Ramachandran Subramanian, San Diego, CA (US); Srinivasan Balasubramanian, San Diego, CA (US); Daniel Fred Filipovic, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 106 days.

(21) Appl. No.: 15/254,752

(22) Filed: Sep. 1, 2016

(65) Prior Publication Data

US 2017/0064572 A1  Mar. 2, 2017

Related U.S. Application Data

(60) Provisional application No. 62/213,508, filed on Sep. 2, 2015.

(51) Int. Cl.
*H04W 4/00* (2018.01)
*H04W 24/08* (2009.01)
(Continued)

(52) U.S. Cl.
CPC ......... *H04W 24/08* (2013.01); *H04L 65/1063* (2013.01); *H04L 65/4061* (2013.01);
(Continued)

(58) Field of Classification Search
CPC ....... H04W 24/08; H04W 40/02; H04W 4/22; H04W 76/022; H04W 4/02; H04W 8/26; H04L 65/80; H04L 65/1063; H04L 65/4061
See application file for complete search history.

(56) References Cited

U.S. PATENT DOCUMENTS 8,134,989 B2  3/2012  Holm et al.
8,219,094 B2  7/2012  Huber et al.
(Continued)

FOREIGN PATENT DOCUMENTS

EP  1829399 A1  9/2007

OTHER PUBLICATIONS

<Span style="font-family: calibri;">Augustyniak P., "Adaptive Architecture for Assisted Living Systems", IEEE, 6th International Conference on Human System Interactions (HSI), Sopot, Poland, Jun. 6-8, 2013, pp. 562-569.
(Continued)

*Primary Examiner* — Afshawn M Towfighi
(74) *Attorney, Agent, or Firm* — Qualcomm IP Dept.; James Hunt Yancey, Jr.

(57) ABSTRACT

A method of wireless communication is disclosed, in which a wearable device may determine whether a network operator provides support for bursty communication, and communicate directly through the network operator in the bursty communication in response to the determining the network operator provides the support for bursty communication. The support for bursty communication by the network operator may be either integrated into a telephony application server (TAS) or a wearable application server (WAS) that is a separate entity from the TAS and deployed between the TAS and the wearable device. The bursty communication by the wearable device may include receiving packets in the bursty communication, buffering the received packets, and transmitting or playing out the bursty communication in entirety after all of the packets in the bursty communication have been received. Apparatus corresponding to such method is also disclosed.

30 Claims, 16 Drawing Sheets

(51) Int. Cl.
- *H04W 76/02* (2009.01)
- *H04W 8/26* (2009.01)
- *H04W 4/22* (2009.01)
- *H04W 4/02* (2018.01)
- *H04W 40/02* (2009.01)
- *H04L 29/06* (2006.01)

(52) U.S. Cl.
CPC ............... *H04L 65/80* (2013.01); *H04W 4/02* (2013.01); *H04W 4/22* (2013.01); *H04W 8/26* (2013.01); *H04W 40/02* (2013.01); *H04W 76/022* (2013.01)

(56) References Cited

U.S. PATENT DOCUMENTS

| | | | |
|---|---|---|---|
| 9,065,765 B2 * | 6/2015 | Alisawi | ................ H04L 47/32 |
| 2015/0163352 A1 | 6/2015 | Ritter et al. | |
| 2017/0238322 A1 * | 8/2017 | Sen | ................ H04W 72/0493 |
| | | | 370/329 |

OTHER PUBLICATIONS

Huawei., et al., "SMARTER Use Case for Wearable Device Communication", 3GPP Draft; S1-152706, 3rd Generation Partnership Project (3GPP), Mobile Competence Centre; 650, Route Des Lucioles; F-06921 Sophia-Antipolis Cedex, vol. SA WG1, no. Belgrade, Republic of Serbia; Aug. 17, 2015-Aug. 21, 2015, Aug. 24, 2015 (Aug. 24, 2015), XP051042911, 3 pages. Retrieved from the Internet: URL: http://www.3gpp.org/ftp/tsg_sa/WG1_Serv/TSGS1_71_Belgrade/Docs/ [retrieved on Aug. 24, 2015].
International Search Report and Written Opinion—PCT/US2016/050180—ISA/EPO—dated Nov. 29, 2016.

* cited by examiner

US 9,998,939 B2

TRANSMISSIONS FOR WEARABLE DEVICES

CROSS-REFERENCE TO RELATED APPLICATIONS

This application claims the benefit of U.S. Provisional Patent Application No. 62/213,508, entitled, "Transmissions for Wearable Devices," filed on Sep. 2, 2015, which is expressly incorporated by reference herein in its entirety.

BACKGROUND

Field

Aspects of the present disclosure relate generally to wireless communication systems, and more particularly, to transmission methods and systems for wearable devices.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

A wearable device may establish communication transmissions with a UE, another wearable device, or other entities in the communication network. A wearable device may be a watch, a wrist band, a head band, glasses, contact lenses, or any device that is incorporated into items of clothing or accessories that can be worn by a user. The goal of wearable technologies may include smoothly incorporating functional electronics and computers into users' daily lives, and allowing users to access information real-time. Research and development continue to advance wearable technologies with respect to transmission quality and stability, power management, and heat issue control.

SUMMARY

In one aspect of the disclosure, a method for wireless communication is disclosed. The method includes determining operator support for bursty communication, and communicating directly through an operator in bursty or continuous transmission in response to determined operator support.

In an additional aspect of the disclosure, a method for wireless communication is disclosed. The method includes buffering, at a wearable device, voice input in an uplink buffer for transmission during a burst transmission timer, and transmitting all of buffered voice input at either: expiration of burst transmission timer, or detection of user silence.

In an additional aspect of the disclosure, a method for wireless communication is disclosed. The method includes receiving, at an application server, downlink voice data from a remote communication device via either bursty or continuous transmission for delivery to a wearable device in communication with the application server, buffering downlink voice data in a downlink buffer during downlink voice data reception, and transmitting buffered downlink voice data via bursty transmission to the wearable device in response to establishing connection with the wearable device.

In an additional aspect of the disclosure, a method for wireless communication is disclosed. The method includes establishing communication for a conference call from a focus server with one or more wearable devices using bursty transmission, establishing communication for the conference call with one or more communication devices using regular voice communications, and playing voice data of bursty transmission received from the one or more wearable devices to the regular voice communications based on one or more of: detection of silence, predetermined time-outs, or receiving bursty transmission of voice data.

In an additional aspect of the disclosure, a method for wireless communication is disclosed. The method includes requesting, by a wearable device, session establishment with another wearable device, receiving buffering capability information from the another wearable device, and determining a burst size for bursty transmissions based at least in part on the buffering capability information.

In an additional aspect of the disclosure, a method for wireless communication is disclosed. The method includes receiving a plurality of voice data packets in bursty transmission, receiving one or more video data packets synchronized to associated packets of the plurality of voice data packets, buffering the plurality of voice data packets and the one or more video data packets in a buffer, and initiating sequential play of the plurality of voice data packets after expiration of a delay timer if all of the one or more video data packets have not been received before the expiration.

In an additional aspect of the disclosure, a method for wireless communication is disclosed. The method includes establishing communication between a wearable device and a second communication device, exchanging a first signal identifying a continuous mode of operation for transmissions between the wearable device and the second communication device, monitoring channel conditions at the wearable device, and exchanging a second signal identifying a bursty mode of operation for transmissions between the wearable device and the second communication device when channel conditions exceed a predetermined threshold.

In an additional aspect of the disclosure, a method for wireless communication is disclosed. The method includes determining that a telephony application server does not support burstyvoice communications, determining no accessible intermediate server that supports burstyvoice communications, monitoring for a speech opportunity in received voice packets from one or more remote communication devices in communication with a wearable device, and transmitting voice packets via continuous transmission in response to detecting the speech opportunity.

In an additional aspect of the disclosure, a method for wireless communication is disclosed. The method includes detecting presence of a UE associated with a wearable device, establishing communication between the wearable device and the UE using a short-range radio access technology (RAT), transmitting uplink communications from the wearable device to the UE via bursty transmissions to be converted to continuous transmission at the UE, and receiving downlink communications at the wearable device from the UE via bursty transmissions converted from continuous transmissions received at the UE.

In an additional aspect of the disclosure, a method for wireless communication is disclosed. The method includes determining, by a wearable device, whether a network operator provides support for bursty communication, the support for bursty communication being either integrated into a telephony application server (TAS) or a wearable application server (WAS) that is a separate entity from the TAS and deployed between the TAS and the wearable device, and communicating, by the wearable device, directly through the network operator in the bursty communication in response to the determining the network operator provides the support for bursty communication, the communicating including receiving packets in the bursty communication, buffering the received packets, and transmitting or playing out the bursty communication in entirety after all of the packets in the bursty communication have been received.

In an additional aspect of the disclosure, an apparatus configured for wireless communication is disclosed. The apparatus includes means for determining, by a wearable device, whether a network operator provides support for bursty communication, the support for bursty communication being either integrated into a telephony application server (TAS) or a wearable application server (WAS) that is a separate entity from the TAS and deployed between the TAS and the wearable device, and means for communicating, by the wearable device, directly through the network operator in the bursty communication in response to the determining the network operator provides the support for bursty communication, the means for communicating including means for receiving packets in the bursty communication, means for buffering the received packets, and means for transmitting or means for playing out the bursty communication in entirety after all of the packets in the bursty communication have been received.

In an additional aspect of the disclosure, an apparatus configured for wireless communication is disclosed. The apparatus includes at least one processor and a memory coupled to the at least one processor, the at least one processor being configured to determine, by a wearable device, whether a network operator provides support for bursty communication, the support for bursty communication being either integrated into a telephony application server (TAS) or a wearable application server (WAS) that is a separate entity from the TAS and deployed between the TAS and the wearable device, and to communicate, by the wearable device, directly through the network operator in the bursty communication in response to the determining the network operator provides the support for bursty communication, the configuration of the at least one processor to communicate including configuration to receive packets in the bursty communication, configuration to buffer the received packets, and configuration to transmit or configuration to play out the bursty communication in entirety after all of the packets in the bursty communication have been received.

In an additional aspect of the disclosure, a computer program product for wireless communication is disclosed. The computer program product for wireless communication includes a non-transitory computer-readable medium having program code recorded thereon, the program code including program code for determining, by a wearable device, whether a network operator provides support for bursty communication, the support for bursty communication being either integrated into a telephony application server (TAS) or a wearable application server (WAS) that is a separate entity from the TAS and deployed between the TAS and the wearable device, and program code for communicating, by the wearable device, directly through the network operator in the bursty communication in response to the determining the network operator provides the support for bursty communication, the program code for communicating including program code for receiving packets in the bursty communication, program code for buffering the received packets, and program code for transmitting or program code for playing out the bursty communication in entirety after all of the packets in the bursty communication have been received.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label.

Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 10 is a block diagram illustrating an exemplary signaling flow for originating a call from a wearable device when a network operator does not support bursty transmissions with the wearable device, but allows connectivity to a third-party AS.

FIG. 11 is a block diagram illustrating an exemplary signaling flow for originating a call from a wearable device when a network operator does not support bursty transmissions with the wearable device, and does not allow connectivity to a third-party AS.

FIG. 14 is a block diagram illustrating an exemplary signaling flow for a MT call when a network operator does not support bursty transmissions with a wearable device, but allows connectivity to a third-party AS.

DETAILED DESCRIPTION

Figure 1:
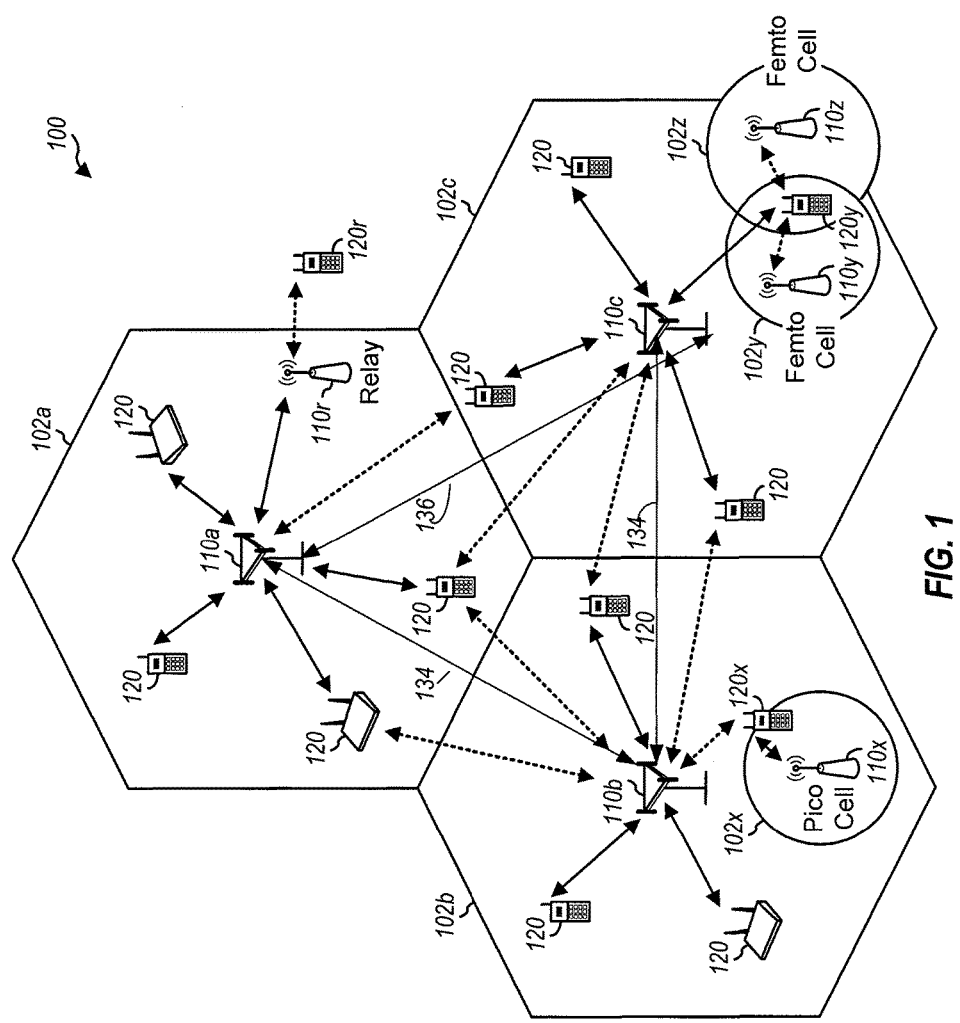
FIG. 1 is a block diagram illustrating details of a wireless communication system.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. For clarity, certain aspects of the apparatus and techniques may be described below for LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

A new carrier type based on LTE/LTE-A including in unlicensed spectrum has also been suggested that can be compatible with carrier-grade WiFi, making LTE/LTE-A with unlicensed spectrum an alternative to WiFi. LTE/LTE-A, when operating in unlicensed spectrum, may leverage LTE concepts and may introduce some modifications to physical layer (PHY) and media access control (MAC) aspects of the network or network devices to provide efficient operation in the unlicensed spectrum and meet regulatory requirements. The unlicensed spectrum used may range from as low as several hundred Megahertz (MHz) to as high as tens of Gigahertz (GHz), for example. In operation, such LTE/LTE-A networks may operate with any combination of licensed or unlicensed spectrum depending on loading and availability. Accordingly, it may be apparent to one of skill in the art that the systems, apparatus and methods described herein may be applied to other communications systems and applications.

System designs may support various time-frequency reference signals for the downlink and uplink to facilitate beamforming and other functions. A reference signal is a signal generated based on known data and may also be referred to as a pilot, preamble, training signal, sounding signal, and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas; however, LTE systems do not in general provide for coordination of sending of reference signals from multiple base stations or eNBs.

In some implementations, a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. Reciprocity may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations, orthogonal frequency division multiplexing (OFDM) is used for the downlink—that is, from a base station, access point or eNodeB (eNB) to a user terminal or UE. Use of OFDM meets the LTE requirement for spectrum flexibility and enables cost-efficient solutions for very wide carriers with high peak rates, and is a well-established technology. For example, OFDM is used in standards such as IEEE 802.11a/g, 802.16, High Performance Radio LAN-2 (HIPERLAN-2, wherein LAN stands for Local Area Network) standardized by the European Telecommunications Standards Institute (ETSI), Digital Video Broadcasting (DVB) published by the Joint Technical Committee of ETSI, and other standards.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in the 3GPP specifications, such as, for example, 3GPP TS 36.211.

UMTS LTE supports scalable carrier bandwidths from 20 MHz down to 1.4 MHZ. In LTE, an RB is defined as 12 sub-carriers when the subcarrier bandwidth is 15 kHz, or 24 sub-carriers when the sub-carrier bandwidth is 7.5 kHz. In an exemplary implementation, in the time domain there is a defined radio frame that is 10 ms long and consists of 10 subframes of 1 millisecond (ms) each. Every subframe consists of 2 slots, where each slot is 0.5 ms. The subcarrier spacing in the frequency domain in this case is 15 kHz. Twelve of these subcarriers together (per slot) constitute an RB, so in this implementation one resource block is 180 kHz. Six Resource blocks fit in a carrier of 1.4 MHz and 100 resource blocks fit in a carrier of 20 MHz.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 shows a wireless network 100 for communication, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x. And, the eNBs 110y and 110z are femto eNBs for the femto cells 102y and 102z, respectively. An eNB may support one or multiple (e.g., two, three, four, and the like) cells.

The wireless network 100 also includes relay stations. A relay station is a station that receives a transmission of data and/or other information from an upstream station (e.g., an eNB, a UE, or the like) and sends a transmission of the data and/or other information to a downstream station (e.g., another UE, another eNB, or the like). A relay station may also be a UE that relays transmissions for other UEs. In the example shown in FIG. 1, a relay station 110r may communicate with the eNB 110a and a UE 120r, in which the relay station 110r acts as a relay between the two network elements (the eNB 110a and the UE 120r) in order to facilitate communication between them. A relay station may also be referred to as a relay eNB, a relay, and the like.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
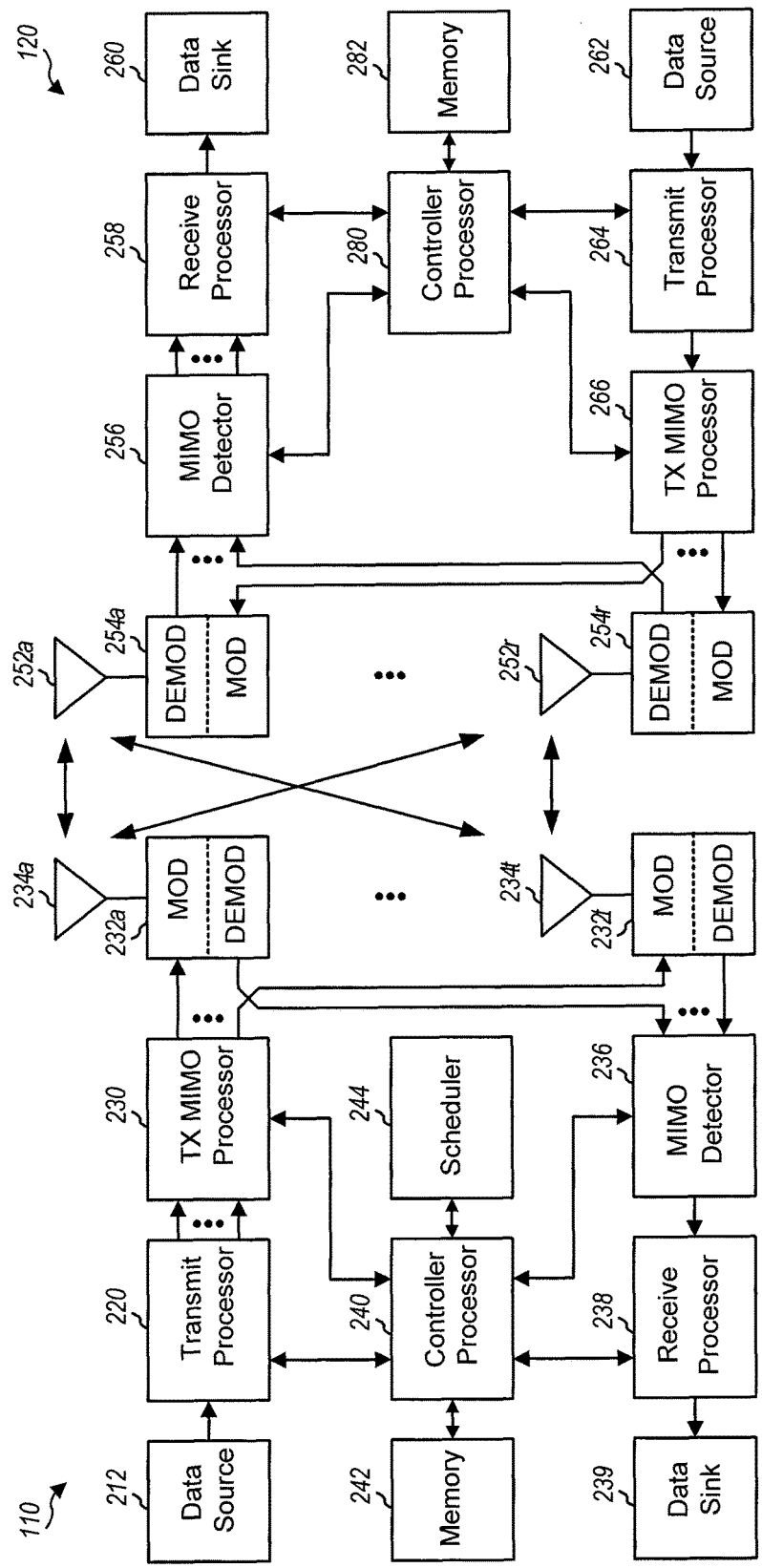
FIG. 2 is a block diagram conceptually illustrating a design of a base station/eNB and a UE configured according to one aspect of the present disclosure.
Figure 3:
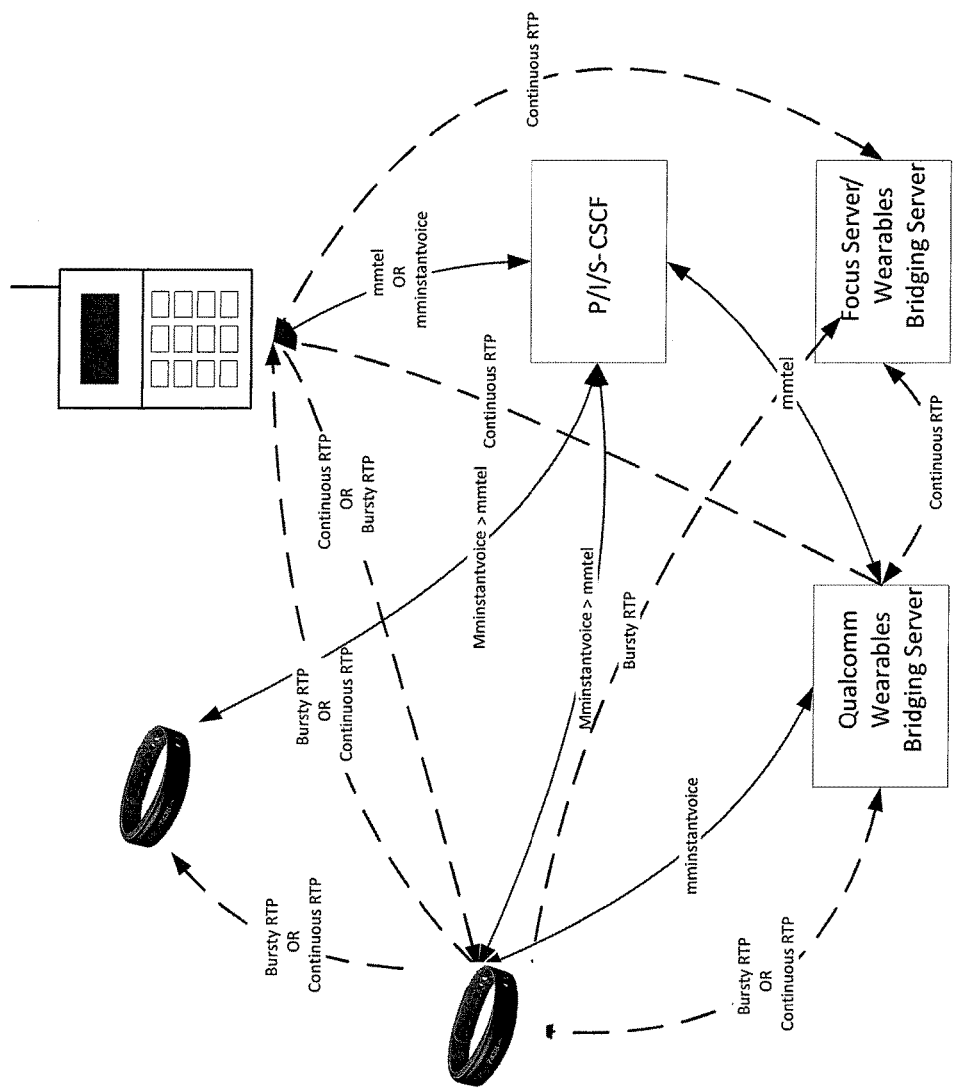
FIG. 3 is a block diagram illustrating a wireless communication system for operating a wearable device.
Figure 4:
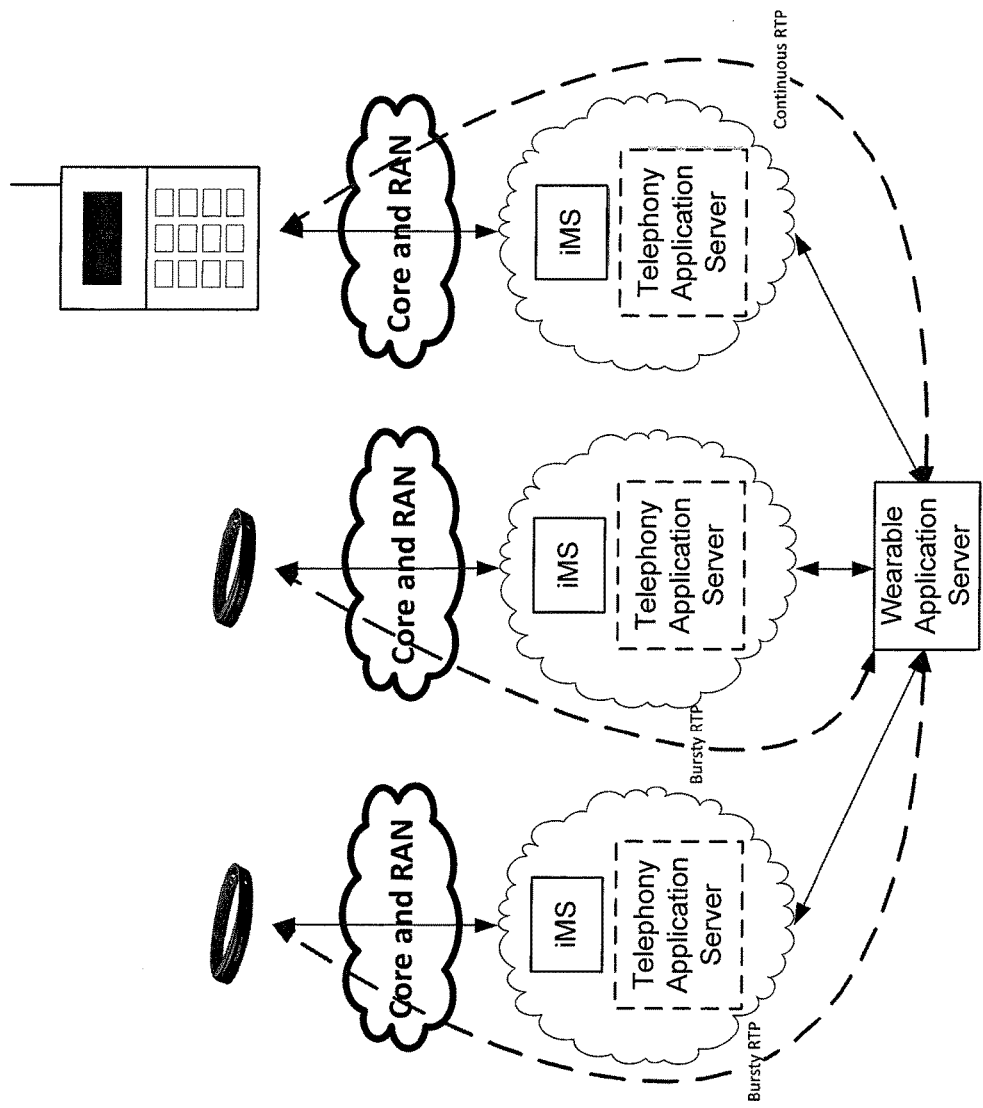
FIG. 4 is a block diagram illustrating a wireless communication system for operating a wearable device.

FIG. 2 shows a block diagram of a design of a base station/eNB 110 and a UE 120, which may be one of the base stations/eNBs and one of the UEs in FIG. 1. For a restricted association scenario, the eNB 110 may be the macro eNB 110c in FIG. 1, and the UE 120 may be the UE 120y. The eNB 110 may also be a base station of some other type. The eNB 110 may be equipped with antennas 234a through 234t, and the UE 120 may be equipped with antennas 252a through 252r.

At the eNB 110, a transmit processor 220 may receive data from a data source 212 and control information from a controller/processor 240. The control information may be for the PBCH, PCFICH, PHICH, PDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the eNB 110 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at the UE 120, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the eNB 110. At the eNB 110, the uplink signals from the UE 120 may be received by the antennas 234, processed by the demodulators 232, detected by a MIMO detector 236 if applicable, and further processed by a receive processor 238 to obtain decoded data and control information sent by the UE 120. The processor 238 may provide the decoded data to a data sink 239 and the decoded control information to the controller/processor 240.

Figure 5:
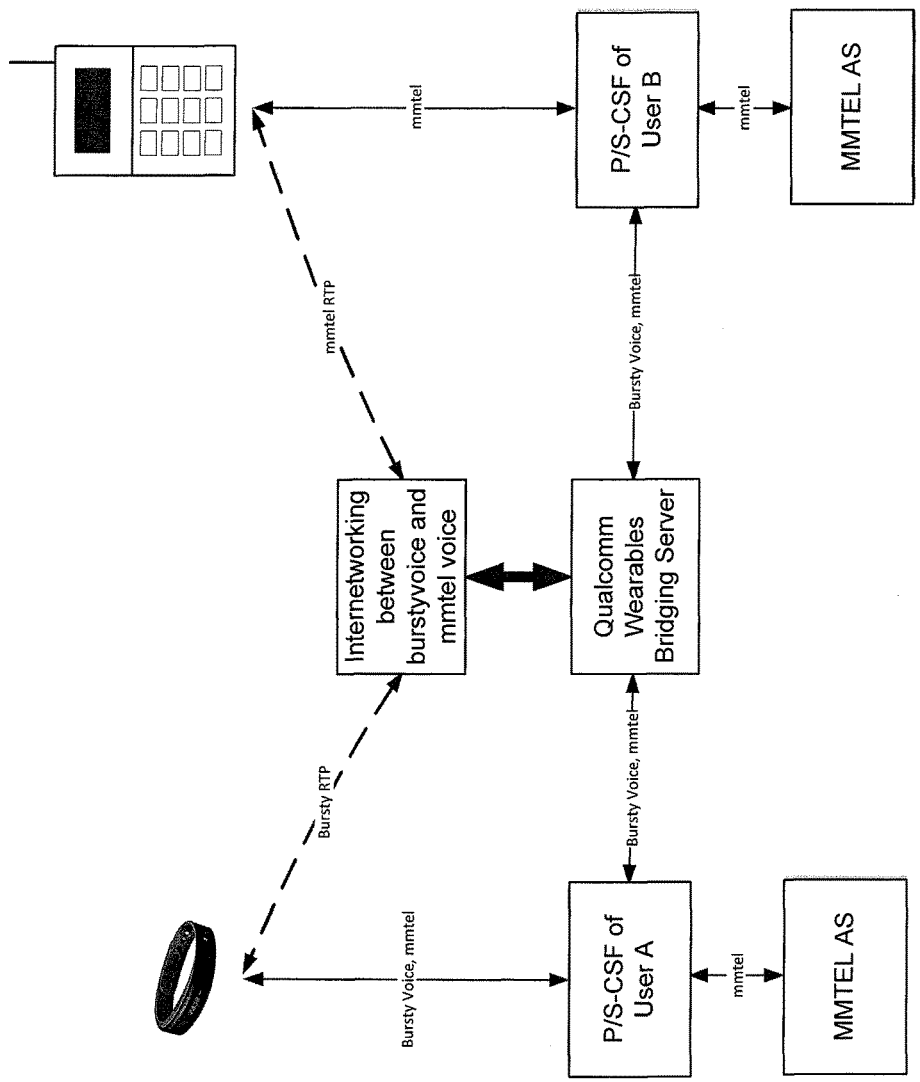
FIG. 5 is a block diagram illustrating a wireless communication system for operating a wearable device.
Figure 6:
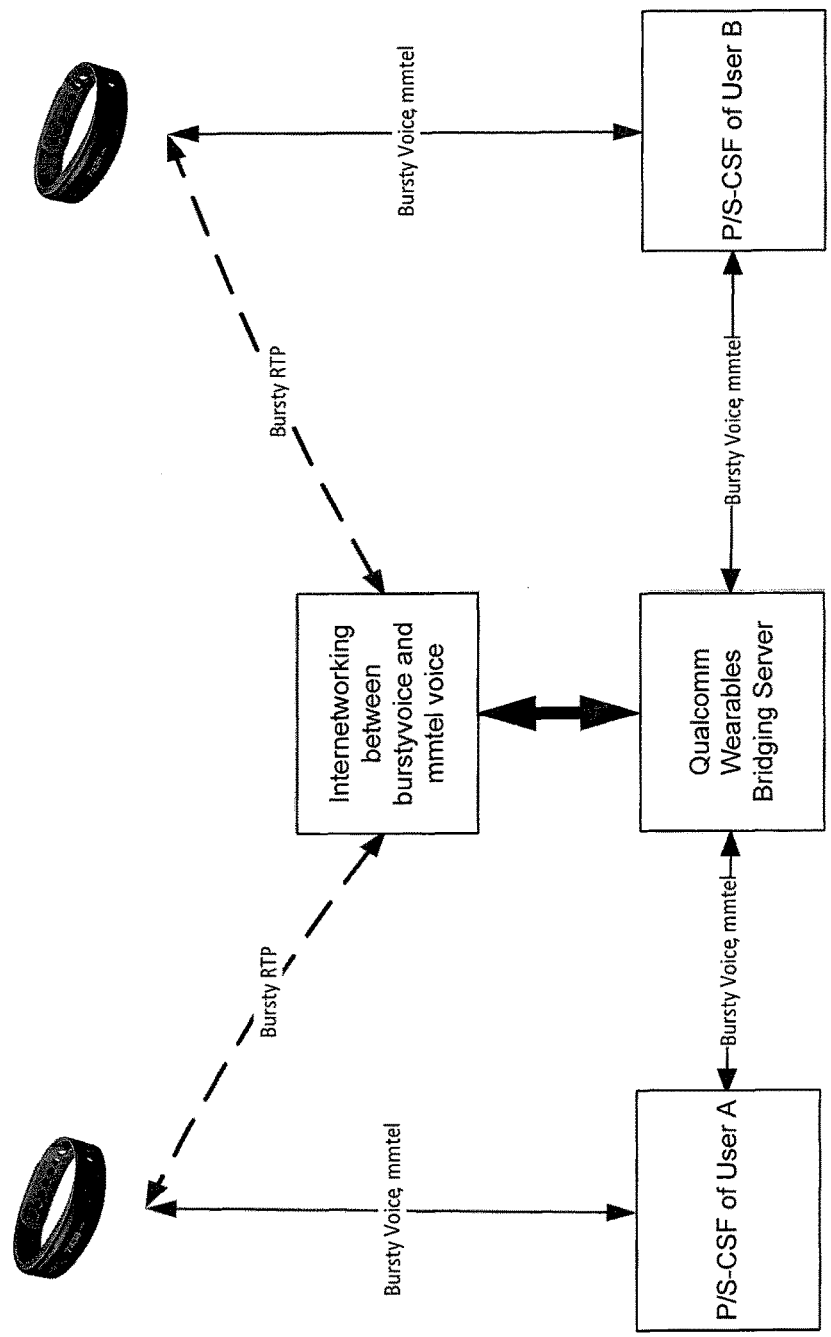
FIG. 6 is a block diagram illustrating a wireless communication system for operating a wearable device.

The controllers/processors 240 and 280 may direct the operation at the eNB 110 and the UE 120, respectively. The controller/processor 240 and/or other processors and modules at the eNB 110 may perform or direct the execution of various processes for the techniques described herein. The controllers/processor 280 and/or other processors and modules at the UE 120 may also perform or direct the execution of the functional blocks illustrated in FIGS. 5-7, and/or other processes for the techniques described herein. The memories 242 and 282 may store data and program codes for the eNB 110 and the UE 120, respectively. A scheduler 244 may schedule UEs for data transmission on the downlink and/or uplink.

The embodiments presented below and other embodiments are further described in greater detail in the attached Appendix A and Appendix B. While the specification describes particular examples of the present invention, those of ordinary skill can devise variations of the present invention without departing from the inventive concept. For example, the teachings herein are related to media transmissions for a wearable device.

General Operation of a Wearable Device

Communication sessions may be established between two wearable devices, a wearable device and a PSTN (public switched telephone network) telephone, a wearable device and a CS (circuit switched) UE, a wearable device and a VoLTE (Voice over Long-Term Evolution) UE, or a wearable device with a PSAP (public-safety access point). Sessions may be voice, video, text messaging, presence, capability exchange, conferencing, or emergency calls. A session between a wearable device and a remote party via a nearby UE that is connected with the wearable device through Bluetooth protocols may seamlessly switch to a session between the wearable device and the same remote party, or a session between the UE and the same remote party. Switches among these three sessions may be feasible.

A wearable device may have control on power consumption and heat sinking. Generally, a power amplifier (PA) in a wearable device may consume about 20% of power of a normal phone. Heat capacity and heat sinking of a wearable device may be about 5% of the heat capacity and heat sinking of a normal phone. As such, heat time constant may go from one hundred (100) seconds down to five (5) seconds. Therefore, PA reduction may usually be not enough to cover the reduction in heat sinking. Also, battery life and power consumption may be issues for a wearable device. Exploring a way to close a link and to understand the region of a cell where an uplink transmission can be consistently maintained is important.

Expectations for a wearable device may include: (1) establishing an IMS (IP multimedia subsystem) session between a wearable and a remote party (PSTN, CS UE, VoLTE UE, or wearable device); (2) establishing a session between a wearable device and a remote party without operator support; (3) controlling thermal issues for continuous voice/video transmissions with a wearable device; (4) controlling transmissions in small burst based on device specific performance, such as an indication of the start and end of a talk burst provided explicitly by a user (through key presses), or determined by the length of silence period between talk bursts; (5) establishing a mechanism to manage voice transmissions; (6) continuously transmitting and receiving voice, media, or other data transmissions at a wearable device.

A wearable device may operate under two modes. When a wearable device is in the proximity of a paired mobile device, the wearable device may rely on the mobile device to support voice transmissions. A short-range pairing between the mobile device and the wearable device may be via Bluetooth connectivity. When a wearable device is not in the proximity of a mobile device, the wearable device may operate in the standalone mode as a full-fledged modem. In this case, thermal control may be an issue.

Architecture of a Wearable Device

FIGS. 3-6 illustrate architecture among one or more wearable devices, normal mobile devices, wearable bridging servers, focus server/wearable bridging servers, WAS (Wearable Application Server), P/I/S-CSCF (Proxy/Interrogating/Serving—Call Session Control Function), TAS (Telephony Application Server), Core and RAN (radio access network), and MMTel AS (Multi-Media Telephony Application Server). An operator's IMS network may or may not support bursty transmissions, for example, bursty transmissions of voice data. If the operator's IMS network does not support bursty transmissions, a WAS may be located outside of the operator's network. If the operator's IMS network supports bursty transmissions of voice data, a WAS may be part of the operator's network. For example, the WAS may be a stand-alone logical entity, or a logical entity being integrated with a TAS. If the WAS is a separate physical entity, the WAS may be located between the TAS and a UE.

I/O Handling for Transmissions of Voice/Video Data

A wearable device may handle conventional MMTel voice (multi-media telephony voice) services. MMTel is a 3GPP solution based on an IMS, and is a solution for a PSTN replacement form of VoIP. It offers converged, fixed and mobile real-time multimedia services that allow users to communicate using voice, video, chat, and sharing image or video files. The MMTel standard is a joint project by the 3GPP and ETSI/Telecoms and Internet Converged Services and Protocols for Advanced Networks (TISPAN) standardization bodies and utilizes a standardized network to network interface (NNI), which enables different operators to communicate with each other using all available multimedia services. Both fixed-line and mobile operators may deploy a single, bearer-independent telephony application that supplants existing circuit telephony and brings an ability to combine voice with video, messaging and other media contents.

In particular, MMTel allows a single SIP session to control virtually all services. All available media components can easily be accessed or activated within the session. Users using MMTel services may start with chat, add voice, add another caller, add video, share files, and drop any of these without losing or having to end the session. The single-session approach enables all media parts of the multimedia communication solution to interoperate.

In addition to conventional voice services via MMTel, a wearable device may also handle a new service type for voice—the "instant voice." Instant voice may include burstyvoice or burstyvideo. In order to process instant voice, both ends of transmissions of instant voice may be able to handle the instant voice. If both ends are wearable devices, both ends may receive burstyvoice or burstyvideo, and play it out after such bursty transmissions have been delivered. If one end is a wearable device, and the other end is a regular device, the regular device may receive burstyvoice or burstyvideo, accumulate it, and then play it out. In this case, a codec negotiation may be MMTel voice for operation in the direction from the regular device to the wearable device, and a codec negotiation may be burstyvoice or burstyvideo for operation in the direction from the wearable device to the regular device.

Floor control for instant voice may be different from PoC (Push to Talk over Cellular) management. For the communication between two wearable devices, each wearable device may manage the recording and playout of received media independently. A user may be provided with an indication upon receipt of a complete voice burst or video burst. A user may choose a specific one or more voice and/or video bursts to play or skip from a number of received voice bursts and/or video bursts before playing out the voice or video bursts. In order to maintain a buffer capacity, received media bursts may be implicitly discarded once they have been played out or trashed by a user. Also, the received media bursts may be set to be discarded after being stored in the buffer for a certain period of time, or upon reaching a threshold of storage. The oldest received media burst may be discarded first. Further, the received media bursts may be set to be cleaned up once a session is released.

A user may be provided with accessibility to a record button on a wearable device at the end of a current media burst playout. If the user chooses to activate recording, this current media burst may be recorded. If the user chooses not to activate recording either by pressing the record button or by another method, the wearable device may begin playing back a next media burst. A video burst may be turned on/off along with a voice burst for recording. A receiving end, either a wearable device or a regular device, may be configured to allow each burst to be played out in order as soon as the burst is received when there is no recording in progress.

For the communication between a wearable device and a regular device, a wearable device may do bursty transmissions while a regular device may do continuous transmissions. A regular device may be configured to detect a pause or silence in the transmissions of media bursts. In response to such pause or silence, the regular device may start playing out media bursts that have been successfully received. It may be beneficial to autonomously handle comfort notice at a regular device without having to receive silence packets from another end. A wearable device may also be configured to detect a pause or silence in the bursty media transmissions. In response to such pause or silence, the wearable device may provide a user with a notification and accessibility to a record button. A user may choose to activate or not to activate recording. In another aspect of the present disclosure, a user may choose to override listening and activate recording if a far-end device is continuously transmitting media data for a certain amount of time. For the communication between a wearable device and a regular device, each device may manage receiving of media bursts independently.

Conference Call with a Wearable Device

A focus server may be used to handle a conference call with a wearable device implementing bursty media transmissions, and one or more regular devices implementing regular media transmissions. Bursty media traffic from the wearable device may be played out in the conference call based on detection of silence during the conference call, and a specific time-out that is not blocked by other speakers, and allows the bursty media traffic to go through. In another aspect of the present disclosure, a focus server may be set to play out the bursty media traffic from the wearable device as soon as the bursty media traffic is completely received.

Session Establishment by a Wearable Device

A wearable device may request to establish a transmission session with another wearable device(s) or regular device(s). The size of media burst to be transmitted may depend upon the buffer capabilities of a receiver device. The burst size may be negotiated as part of the session establishment procedures. A recorded message to be transmitted may be divided into one or more receivable chunks. The recorded message may last for a certain amount of time (e.g., for a few tens (10s) of seconds). Such receivable chunks may be determined based on a receiver device being able to discern such receivable chunks even when the message is played out with gaps.

Dividing a recorded message into one or more receivable chunks may depend on one or more pauses detected during recording. A wearable device may be configured to provide a user with a notification to take a pause during recording in every certain amount of time, e.g., five (5) seconds or few tens (10s) of seconds. In other aspects of the present disclosure, a user may be able to adjust such amount of time to determine the length of each receivable chunks.

Bursty Transmissions

Media bursts may be transmitted in one or more layers. Reliable-mode-RLC (radio link control) may be allocated by the network to carry bursty media transmissions. Media bursts may be RTP (real-time transport protocol) packets to be carried on a UDP (user datagram protocol), or on TCP/IP (transmission control protocol/internet protocol). ROHC (robust header compression) may be enabled when the RTP packets are carried on the UDP.

A transmitter device may plan to transmit a few small silence packets back-to-back at the end of each voice spurt/burst. For example, the transmitter device may consecutively transmit four (4) silence packets. A receiver device may look for such back-to-back small silence packets, and identify them as a stop marker. In another aspect of the present disclosure, a user may explicitly indicate the stop/pause/silence at the end of one or more bursts via a user interface. An RTP sequence numbering may continue seamlessly across a plurality of bursts.

Bursty transmissions may be uplink or downlink transmissions. If bursts are transmitted on both uplink and downlink directions, a call may be negotiated with a burstyvoice feature tag for both uplink and downlink bursty transmissions. This situation may be handled by sensing for voice activities and coordinating the playout versus recording the voice for bursty and continuous transmissions. Bursty transmissions in either one direction or two directions may impact a far-end UE transmit mode and required user behavior. When a receiver only has a single receiver antenna, reliability of burst packets may be increased.

AV-Synchronization

Transmissions of media bursts may include transmitting RTCP (RTP control protocol) packets at the start of the bursty transmissions or during the bursty transmissions. However, the number of RTCP packets needed to retain synchronicity for bursty transmissions may be less than the number of RTCP packets needed to retain synchronicity for regular transmissions. In order to render av-synced media, both audio and video packets associated with audio packets may be received before rendering. The waiting time to render av-synced media may depend on the buffering capacities of a receiver. If a limit to the buffer is reached, av-synced media may be rendered. A bandwidth for RTCP packet transmissions may be negotiated to adjust the waiting time. In some aspects of the present disclosure, if there is a delay on video packets, a receiver may render the voice without video to maintain continuity.

Switch Across Bursty and Continuous Voice Transmissions at a Wearable Device

A wearable device, based on channel conditions, may be able to handle continuous or bursty transmissions in downlink, uplink, or both downlink and uplink directions. A mode of operation for either continuous or bursty transmissions may be initially exchanged between a wearable device and a far-end UE using SIP (session initiation protocol) signaling, and subsequently switch to another mode of operation according to RTCP App (Application-defined) packets that indicate a change of mode. A wearable device may switch from one mode to another mode based on device performance and/or hardware configuration. For example, a wearable device may switch to a bursty mode when high packet errors are detected, and/or RSRQ (reference signal received power) is below a threshold. As a further example, a wearable device may switch to a continuous mode when the RF conditions are good (e.g., RSRQ is above a threshold). In some aspects of the present disclosure, the RTCP App packets exchange may be a three-way exchange to ensure signaling consistency. A wearable device may handle a voice receive part of the switching any time after initiating the switch. A far-end device may handle the voice receive part of the switching any time after the acknowledgement has been sent out without awaiting the completion of a three-way handshake.

A TAS may be enhanced to support a wearable device. Below is Table 1 showing different types of calls being established between different types of TAS and devices.

TABLE 1

| Type of TAS | Remote device | | | |
|---|---|---|---|---|
| | UE-CS | UE-VoLTE | UE-Wearable | Wearable |
| TAS | AMR-WB MMTel | AMR-WB MMTel | AMR-WB MMTel | AMR-WB MMTel |
| TAS enhanced for wearable (B2B UA) | Burstyvoice to eTAS eTAS in media path | Burstyvoice to eTAS eTAS in media path | Burstyvoice to eTAS eTAS in media path Burstyvoice to remote UE | Burstyvoice to wearable |

Using MMTel Services when Instant Voice is not Available

As discussed above, a TAS may support or may not support bursty transmissions. Therefore, when the TAS or any intermediary server is not configured or is not found to support bursty media transmissions, substitute MMTel services may be provided. The TAS or an intermediary server that does not support bursty media transmissions may not understand the mminstantvoice feature tag, but only accept the MMTel feature tag. Under this situation, a wearable device may transmit voice packets using continuous transmissions. However, in some aspects of the present disclosure, the wearable device may disable uplink bursty transmissions when hardware conditions of the wearable device, such as thermal conditions or RF conditions, exceed a predetermined threshold. The wearable device may monitor speech from a far-end device, and may override the talkers. If a duty cycle is not long enough to allow for a user to talk, uplink voice transmissions may be disabled. In some aspects of the present disclosure, a wearable device may provide a user with an indication of when the user can start talking, and when the user needs to stop talking.

During the suspension of uplink voice transmissions, a user may still be allowed to listen on a call, such as a conference call. A wearable device may provide a user with several options upon or during the suspension. For example, a user may choose to continue listening to downlink voice during the suspension. As a further example, a user may choose to send an instant message. When a user want to receive voice data in one direction, and use an instant message service in the other direction, the feature tags may be negotiated accordingly through signaling. When removing MMTel voice services in one direction, corresponding requirements to periodically send one or more silence frames may also be removed. Such silence frames may be transmitted every one hundred and sixty (160) milliseconds.

Registration Procedure

In some aspects of the present disclosure, a wearable device and a UE may share a common IMS public user identity. When a wearable device moves towards a UE, the wearable device and the UE may communicate with each other via a Bluetooth protocol or other available protocols. A user configuration may be used to determine whether Bluetooth connectivity is enabled. If Bluetooth connectivity is not enable, the wearable device and the UE may behave as two independent devices. If Bluetooth connectivity is enabled, IMS registration of a wearable device may remain unaffected or the wearable device may deregister from IMS, and a UE may perform registration using a MMTel feature tag and may not perform registration using a burstyvoice feature tag. Additionally, the wearable device may also register its public user identity. Then, the UE may deactivate call forwarding features, such as CFx, CFU (Call Forwarding Unconditional), CFNA (Call Forwarding Unconditional Activation), CFB (Call Forwarding Busy), CFNL, or CFNRc (Call Forwarding Non-Reachable), to the wearable device. A hysteresis timer may be utilized to avoid a frequent ping-pong between different types of services. When a wearable device moves away from a UE, a wearable device may perform IMS registration normally (if currently deregistered), and determine whether the network supports a burstyvoice feature tag. If yes, the wearable device may register the burstyvoice feature tag. If not, the wearable device may register a MMTel feature tag. A UE may activate call forwarding features to the wearable device, such as CFU. Alternatively or additionally, the UE may activate CFNA, CFB, CFNL, or CFNRc to the wearable device.

In other aspects of the present disclosure, a wearable device and a UE may not share a common IMS public user identity. When a wearable device moves toward a UE, the wearable device and the UE may communicate with each other via a Bluetooth protocol. If Bluetooth connectivity is not enabled, the wearable device and the UE may behave as two independent devices sharing a common profile. If Bluetooth connectivity is enabled, the wearable device may deregister from IMS or keep the IMS registration alive, and a UE may perform registration using a MMTel feature tag and may not perform registration using a burstyvoice feature tag. The wearable device may deactivate forking by the network. A hysteresis timer may be utilized to avoid frequent ping-pong between different types of services. When a wearable device moves away from a UE, a wearable device may perform IMS registration normally (if currently deregistered), and determine whether the network support a burstyvoice feature tag. If yes, the wearable device may register the burstyvoice feature tag, and may additionally register a MMTel feature tag. If not, the wearable device may register a MMTel feature tag. In some aspects of the present disclosure, a paging notification of voice data available and addressed to the IMS public user identity may be received at the wearable device, the UE, or both. The UE may forward the paging notification to the wearable device. Correspondingly, a TAS and/or a WAS may transmit a paging notification to the wearable device, the UE, or both. Such transmissions of paging notification to both the wearable device and the UE may be either sequential or in parallel.

Figure 7:
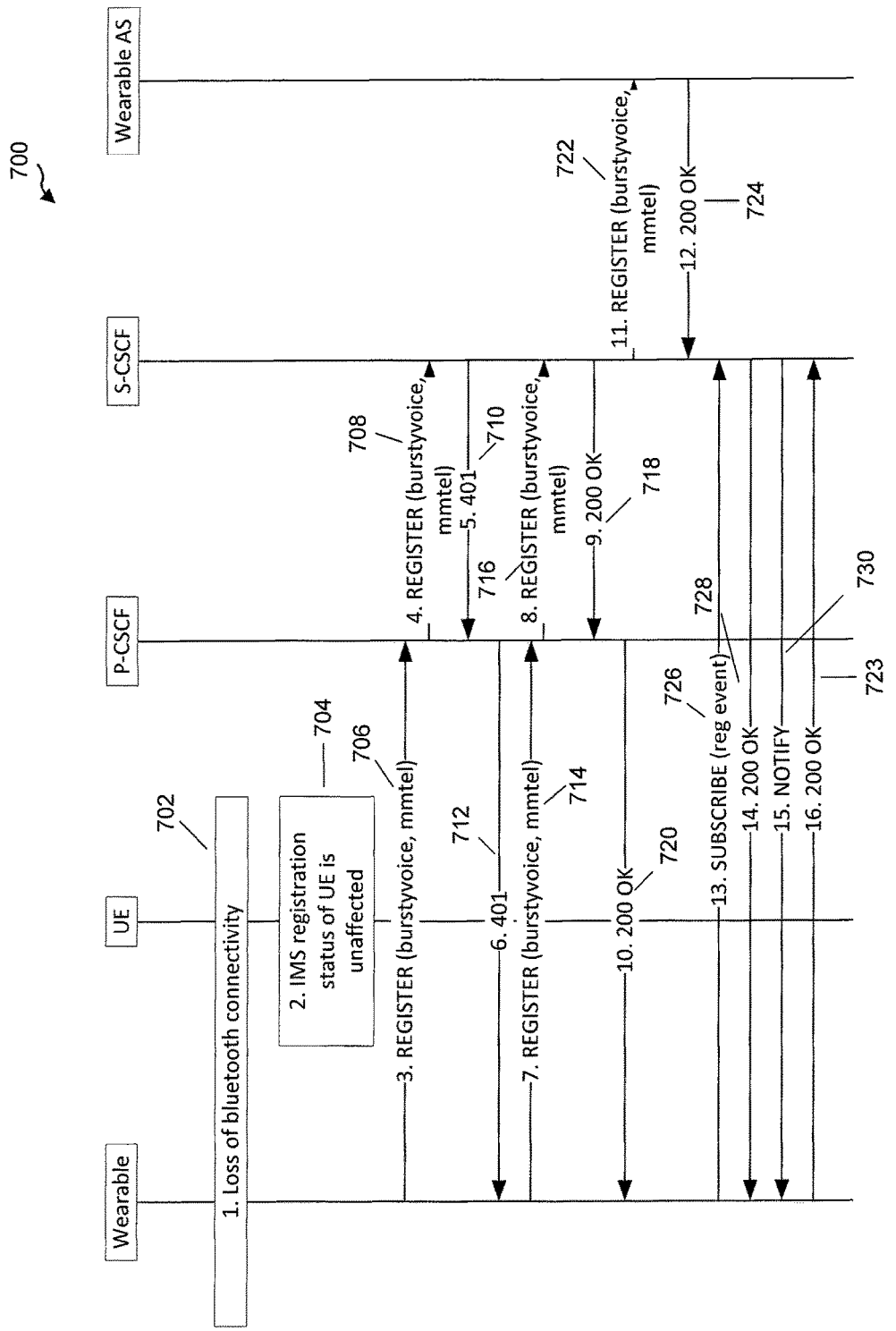
FIG. 7 is a block diagram illustrating an exemplary registration procedure.

FIG. 7 illustrates an exemplary registration procedure 700. At block 702, a wearable device loses Bluetooth connectivity with a UE. At block 704, the IMS registration status of the UE may remain unaffected. At 706 to 724, the wearable device may perform registration for burstyvoice or MMTel services with a P-CSCF, a S-CSCF and a wearable AS. At 726 to 732, the wearable device may complete the registration and subscribe to burstyvoice or MMTel services.

Figure 8:
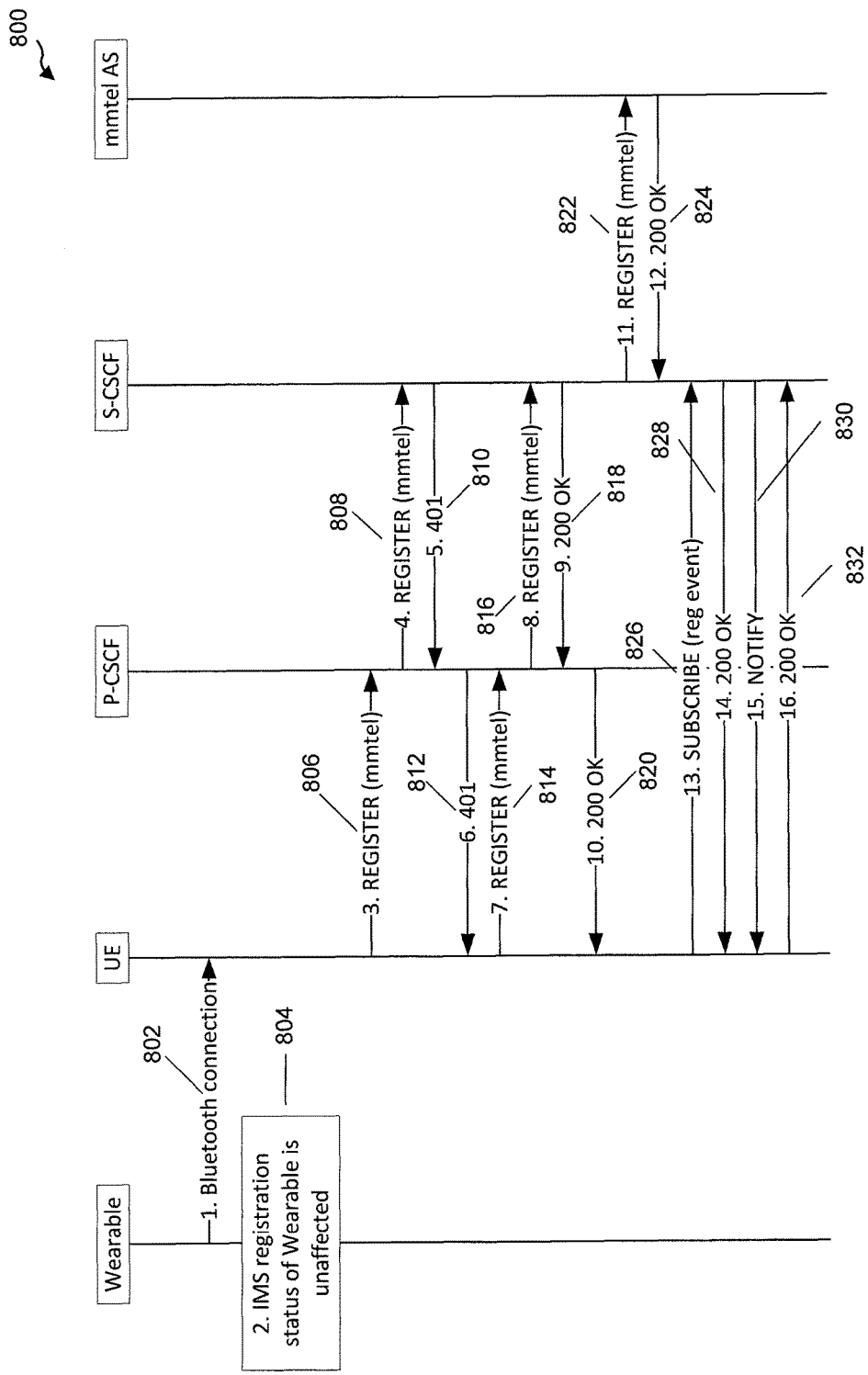
FIG. 8 is a block diagram illustrating an exemplary registration procedure.

FIG. 8 illustrates an exemplary registration procedure 800. At block 802, a Bluetooth connection is established between a wearable device and a UE. At block 804, the IMS registration status of the wearable device may remain unaffected. At 806 to 824, the UE may perform registration for MMTel services with a P-CSCF, S-CSCF and a MMTel AS.

At 826 to 832, the UE may complete the registration and subscribe to MMTel services.

Call Origination

A call may be originated from a wearable device in several ways. For example, a call may be originated from a wearable device using a UE that is paired with the wearable device via Bluetooth connectivity. As a further example, a call may be originated from a wearable device using IMS signaling. A network operator may or may not support bursty transmissions with the wearable device. Further, the network operator that does not support bursty transmissions with the wearable device may or may not support a third-party AS.

In the case that a wearable device is paired with a UE via a short-range RAT (radio access technology), the wearable device may initiate a call to transmit voice data to a remote device via the UE. The wearable device may transmit voice data using bursty transmissions to the UE. The UE may convert the voice data using bursty transmissions into voice data using continuous transmissions, and transmit the voice data using continuous transmissions to the remote device. In some aspects of the present disclosure, the wearable may transmit session information to the UE related to the bursty transmission call, and stop receiving downlink communication data for the bursty transmission call originated at the wearable device. Correspondingly, the UE may receive session information from the wearable device, and transmit a request to the wearable device to transfer the bursty transmission call to the UE.

In an opposite direction, a wearable device may receive voice data from a remote device via a UE. The remote device may transmit voice data using continuous transmissions to the UE. The UE may convert the voice data using continuous transmissions to voice data using bursty transmissions, and transmit the voice data using bursty transmissions to the wearable device. In some aspects of the present disclosure, the UE may transmit session information to the wearable device related to the continuous transmission call. Correspondingly, the wearable device may receive session information from the UE related to the continuous transmission call, and transmit a request through the UE to transfer the continuous transmission call to the wearable device. Such continuous transmission call may be converted to a bursty transmission call at the UE.

Figure 9:
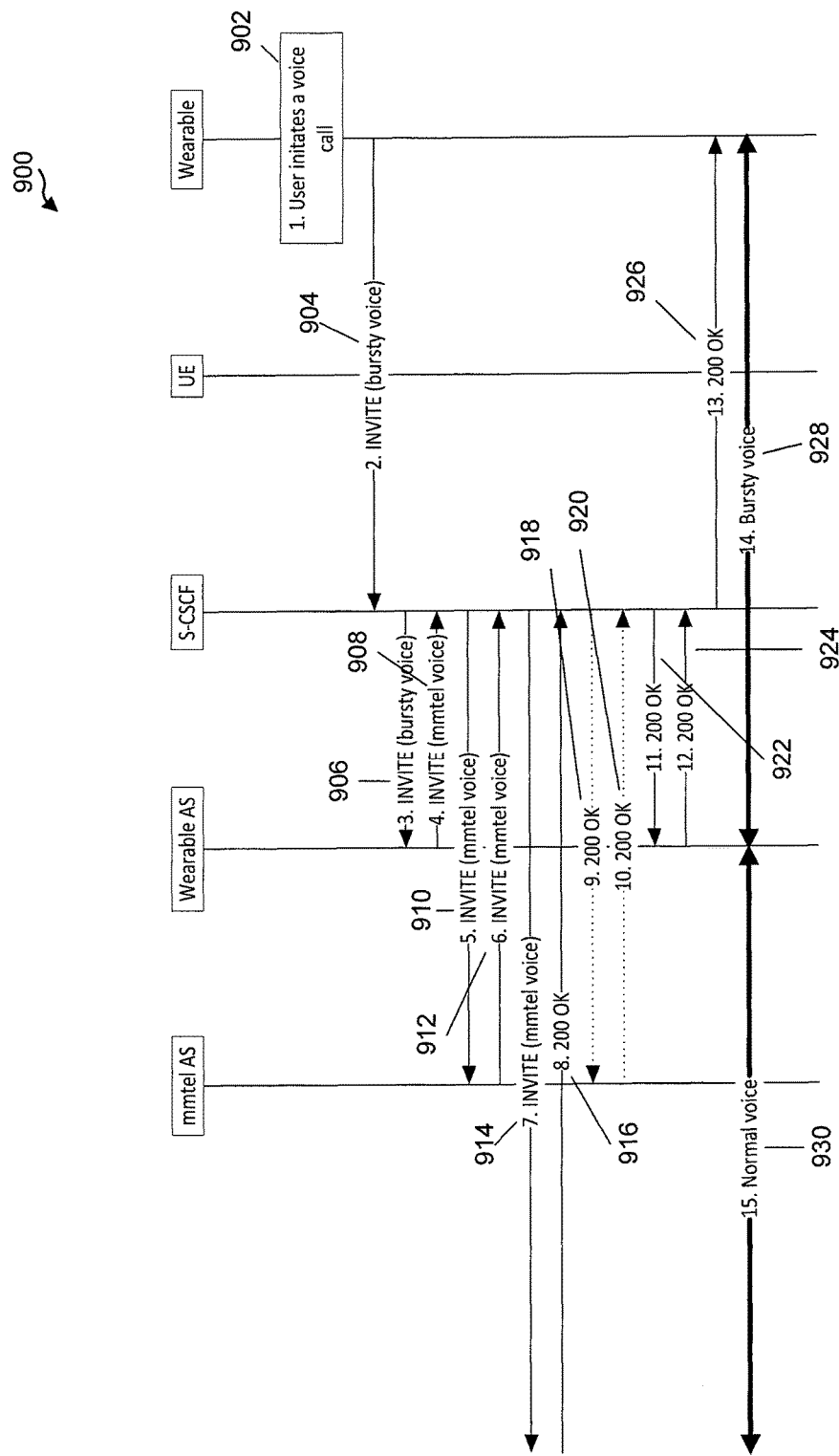
FIG. 9 is a block diagram illustrating an exemplary signaling flow for originating a call from a wearable device when a network operator bursty transmissions with the wearable device.

FIG. 9 illustrates an exemplary signaling flow 900 for originating a call from a wearable device when a network operator supports bursty transmissions with the wearable device. A burstyvoice AS/WAS may support interworking between a remote end and a wearable device. The wearable device may follow normal SIP procedures and offer-answer mechanism to set up a call. An SDP (Service Delivery Platform) offer may be included in an initial call invite. The network may determine whether media packets use a default bearer or a dedicated bearer. Preconditions may be met at the wearable device upon media bearer establishment being confirmed. A codec may be negotiated using a normal procedure, such as AMR (adaptive multi-rate), AMR-WB (adaptive multi-rate wideband), or the like. In some aspects of the present disclosure, 6.6 kbps AMR-WB may be the highest priority. QoS (Quality of Service) support for media packets may be optional. In addition to the burstyvoice AS, a TAS may also be included in the signaling path, and appear after the burstyvoice, AS/WAS. A WAS may set up a normal voice call with a remote end, and interwork between normal voice and burstyvoice transmissions. Mid-call supplementary services may also be supported by existing procedures.

In FIG. 9, at block 902, a user of a wearable device initiates a voice call. At 904, the wearable device may send an invite for burstyvoice services to a S-CSCF. At 906 to 912, several invites for burstyvoice or MMTel voice services may be sent among the S-CSCF, a wearable AS, and a MMTel AS. At 914 and 916, the S-CSCF may send an invite for MMTel voice services to a remote entity, and receive a 200 message (OK message). At 918 to 924, several 200 messages (OK messages) may be sent among the S-CSCF, wearable AS and MMTel AS in response to the sent invites at 906 to 912. At 926, the S-CSCF may send a 200 message (OK message) to the wearable device. At 928, burstyvoice may be transmitted between the wearable device and the wearable AS. At 930, normal voice may be transmitted between the MMTel AS and a remote entity.

Figure 10:
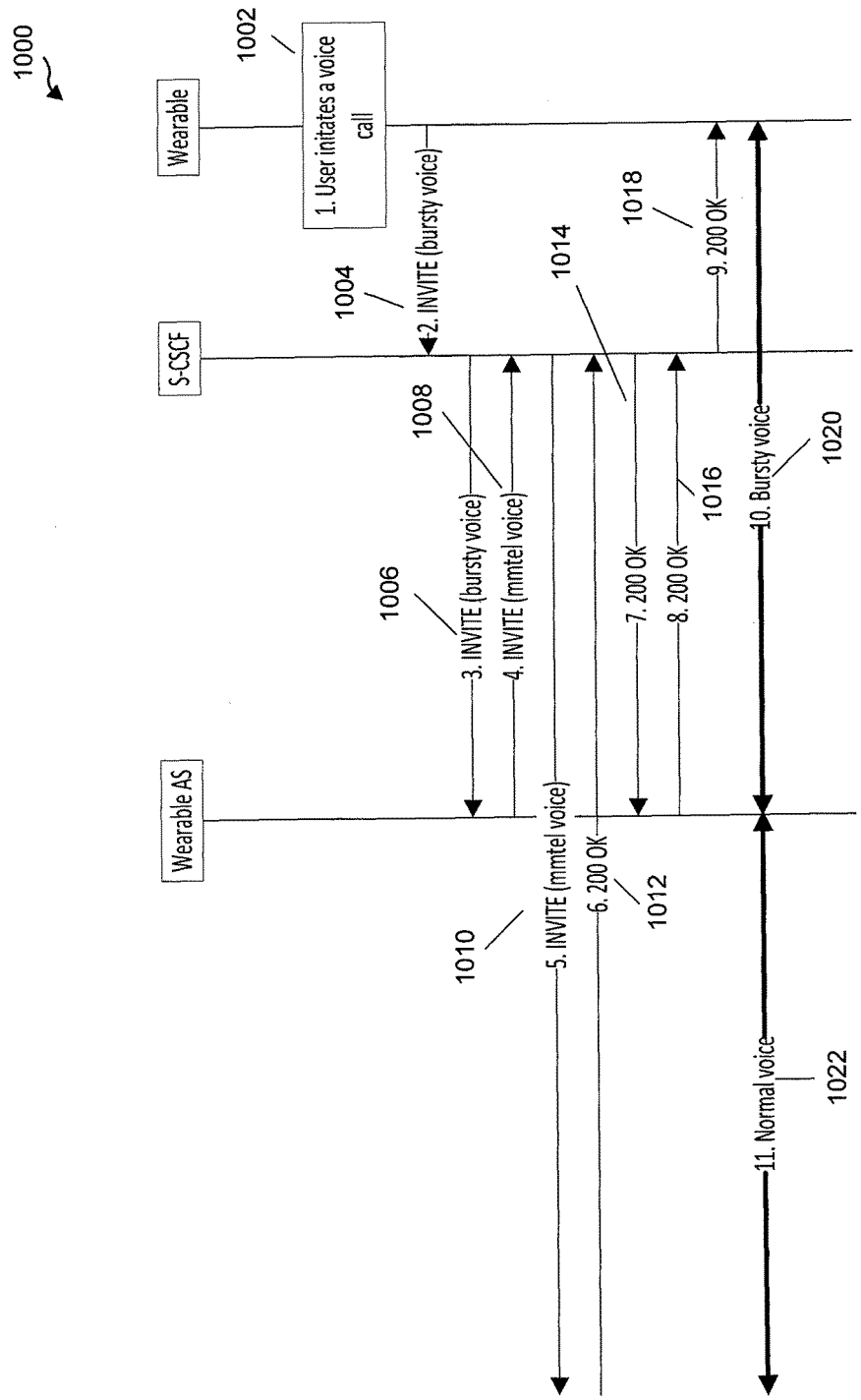

FIG. 10 illustrates an exemplary signaling flow 1000 for originating a call from a wearable device when a network operator does not support bursty transmissions with the wearable device, but allows connectivity to a third-party AS. A burstyvoice AS/WAS may support interworking between a remote end and a wearable device. The wearable device may follow normal SIP procedures and offer-answer mechanism to set up a call. An SDP (Service Delivery Platform) offer may be included in an initial call invite. Media packets between the UE and WAS may go over a default bearer. Preconditions may be met at the wearable device upon media bearer establishment being confirmed. A codec may be negotiated using normal procedure, such as AMR (Adaptive Multi-Rate), AMR-WB (Adaptive Multi-Rate Wideband), or the like. In some aspects of the present disclosure, 6.6 kbps AMR-WB may be the highest priority. QoS (Quality of Service) support for media packets may be optional. In some aspects of the present disclosure, when the network operator does not support bursty transmissions, a TAS may not be included in the signaling path. Accordingly, enhancements to support mid-call supplementary services may be beneficial.

In FIG. 10, at block 1002, a user at a wearable device initiates a voice call. At 1004, the wearable device may send an invite for burstyvoice services to a S-CSCF. At 1006, the S-CSCF may send an invite for burstyvoice services to a wearable AS. At 1008, the wearable AS may send an invite for MMTel voice services to the S-CSCF. At 1010 and 1012, the S-CSCF may send an invite for MMTel voice services to a remote entity, and receive a 200 message (OK message) from the remote entity. At 1014 and 1016, 200 messages (OK messages) may be received by the S-CSCF and wearable AS in response to the sent invites for burstyvoice and MMTel voice services. At 1018, the S-CSCF may send a 200 message (OK message) to the wearable device. At 1020, burstyvoice may be transmitted between the wearable device and wearable AS. At 1022, normal voice may be transmitted between the wearable AS and the remote entity.

Figure 11:
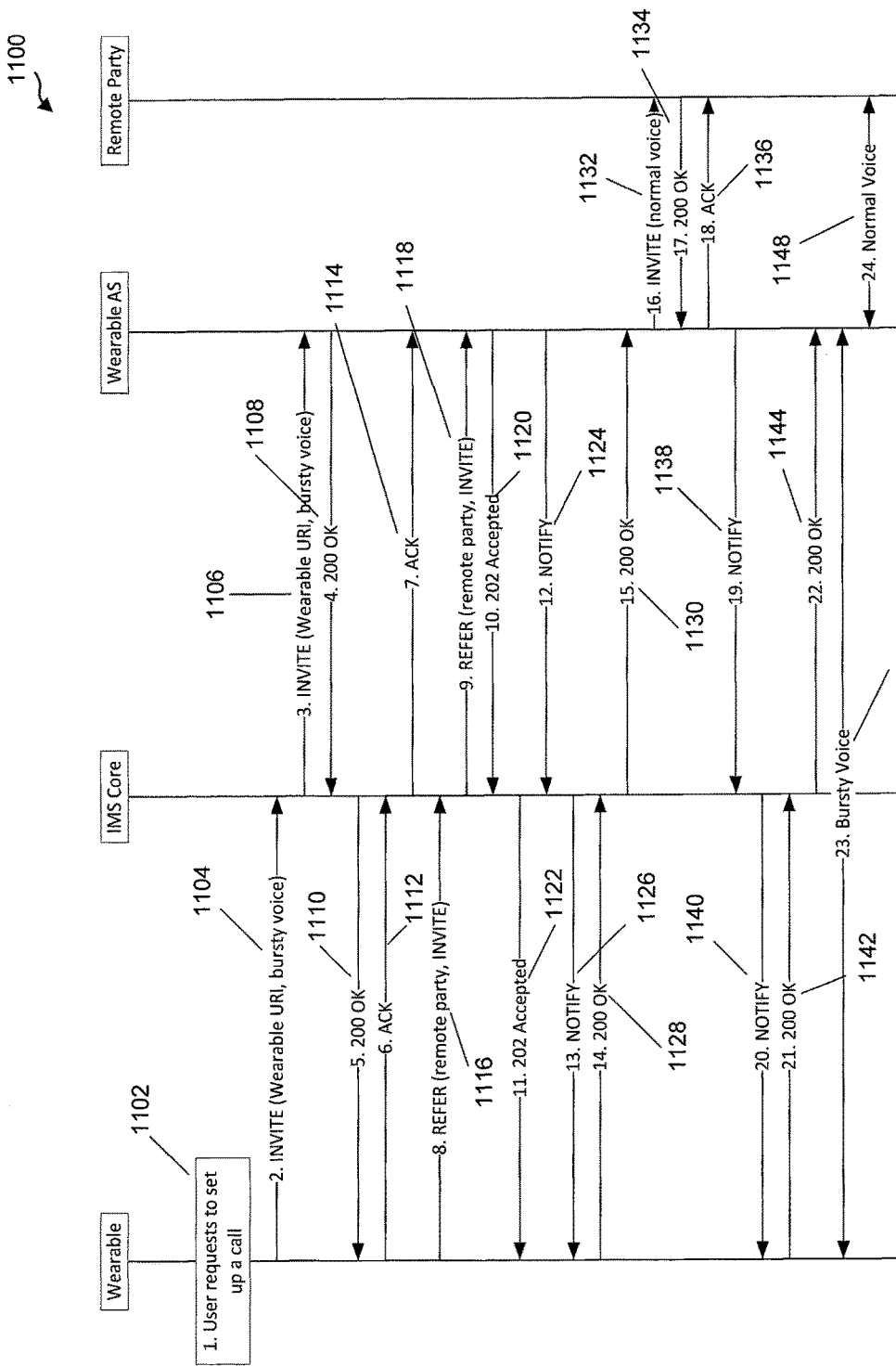

FIG. 11 illustrates an exemplary signaling flow 1100 for originating a call from a wearable device when the network does not support bursty transmissions with the wearable device, and does not allow connectivity to a third-party AS. A burstyvoice AS/WAS may support interworking between a remote end and a wearable device. The wearable device may follow normal SIP procedures and offer-answer mechanism to set up a call with the WAS. URI (uniform resource identifier) of the WAS may be known to the UE. An SDP (Service Delivery Platform) offer may be included in an initial call invite. The network may determine whether media packets use a default bearer or a dedicated bearer. In some aspects of the present disclosure, media packets between the UE and WAS may go over a default bearer. Preconditions may be met at the wearable device upon media bearer establishment being confirmed. A codec may be negotiated using normal procedure, such as AMR (Adaptive Multi-Rate), AMR-WB (Adaptive Multi-Rate Wideband), or the like. In some aspects of the present disclosure, 6.6 kbps AMR-WB may be the highest priority. QoS (Quality of Service) support for media packets may be optional. After establishing a session with the WAS, the UE may request the WAS to set up a call to the remote party. In some aspects of the present disclosure, such call set up may be through an SIP refer. A WAS may set up a normal voice call with a remote end, and interwork between normal voice and burstyvoice.

In FIG. 11, at block 1102, a user at a wearable device requests to set up a call. At 1104 to 1106, the wearable device may send an invite for burstyvoice services to an IMS Core, and the IMS Core may forward such invite to a wearable AS. In response, at 1108 to 1110, the wearable AS may send a 200 message (OK message) to the IMS Core, and the IMS Core may forward such 200 message (OK message) to the wearable device. In response, at 1112 and 1114, the wearable device may send an acknowledge message to the IMS Core, and the IMS Core may forward such acknowledge message to the wearable AS. At 1116 to 1118, the wearable device may send a refer/an invite to the IMS Core, and the IMS Core may forward such invite to the wearable AS. In response, at 1120 to 1130, 200 messages (OK messages), 202 messages (acceptance messages), and notifications may be sent among the wearable device, IMS Core, and wearable AS. At 1132, the wearable AS may send an invite for normal voice services to the remote party. In response, at 1132 to 1144, 200 messages (OK messages) and notifications may be sent among the remote party, wearable AS, IMS Core, and wearable device. At 1146, burstyvoice may be transmitted between the wearable device and the wearable AS. At 1148, normal voice may be transmitted between the wearable AS and the remote party.

Handling of a MT (Mobile Terminated) Call

A call may be received at a wearable device in several ways. For example, a call may be received at a wearable device via a UE that is paired with the wearable device via Bluetooth connectivity. As a further example, a call may be received at a wearable device using IMS signaling. A network operator may or may not support such MT call received at the wearable device.

Figure 12:
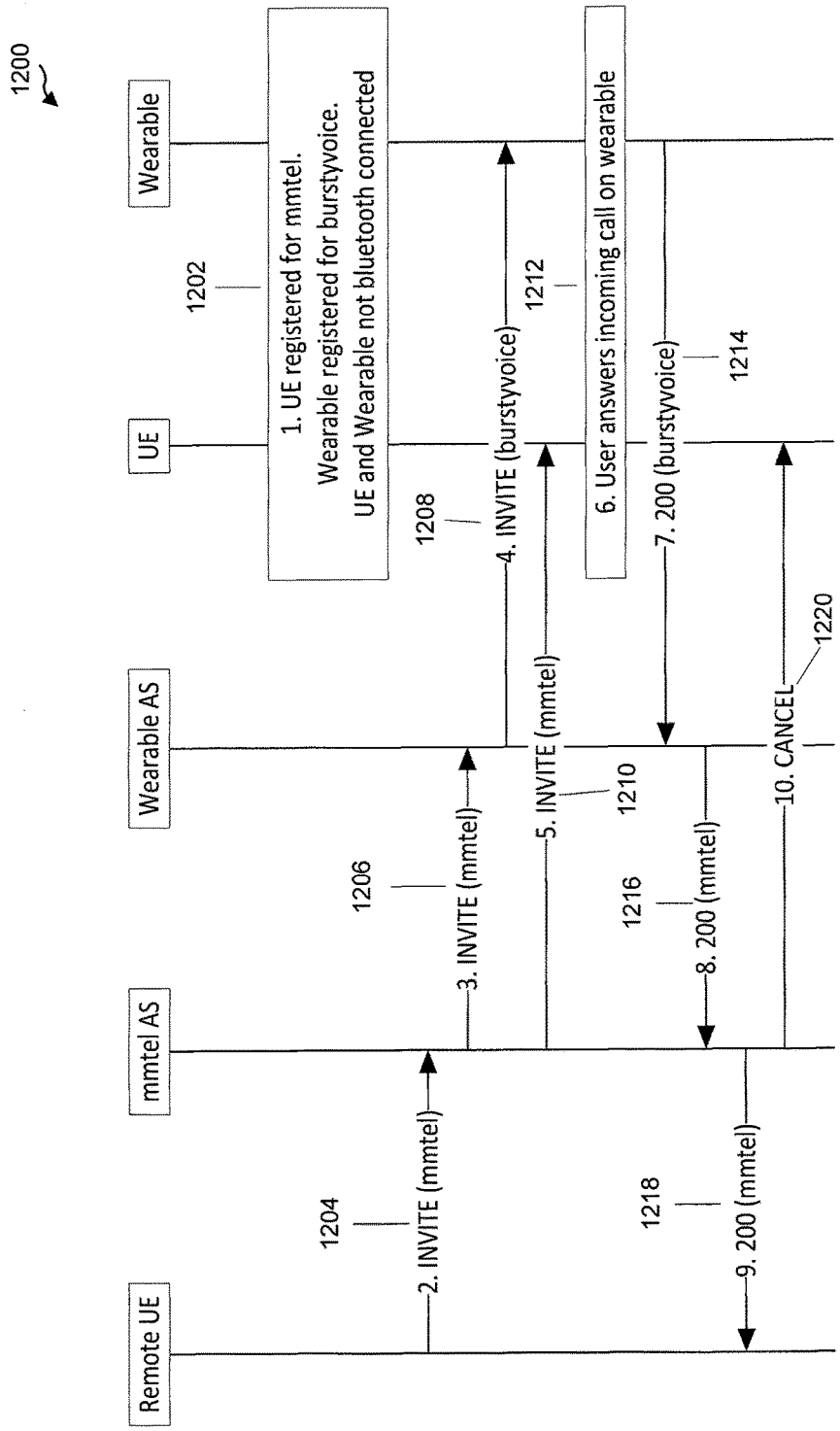
FIG. 12 is a block diagram illustrating an exemplary signaling flow for a MT call when a network operator supports bursty transmissions with a wearable device.
Figure 13:
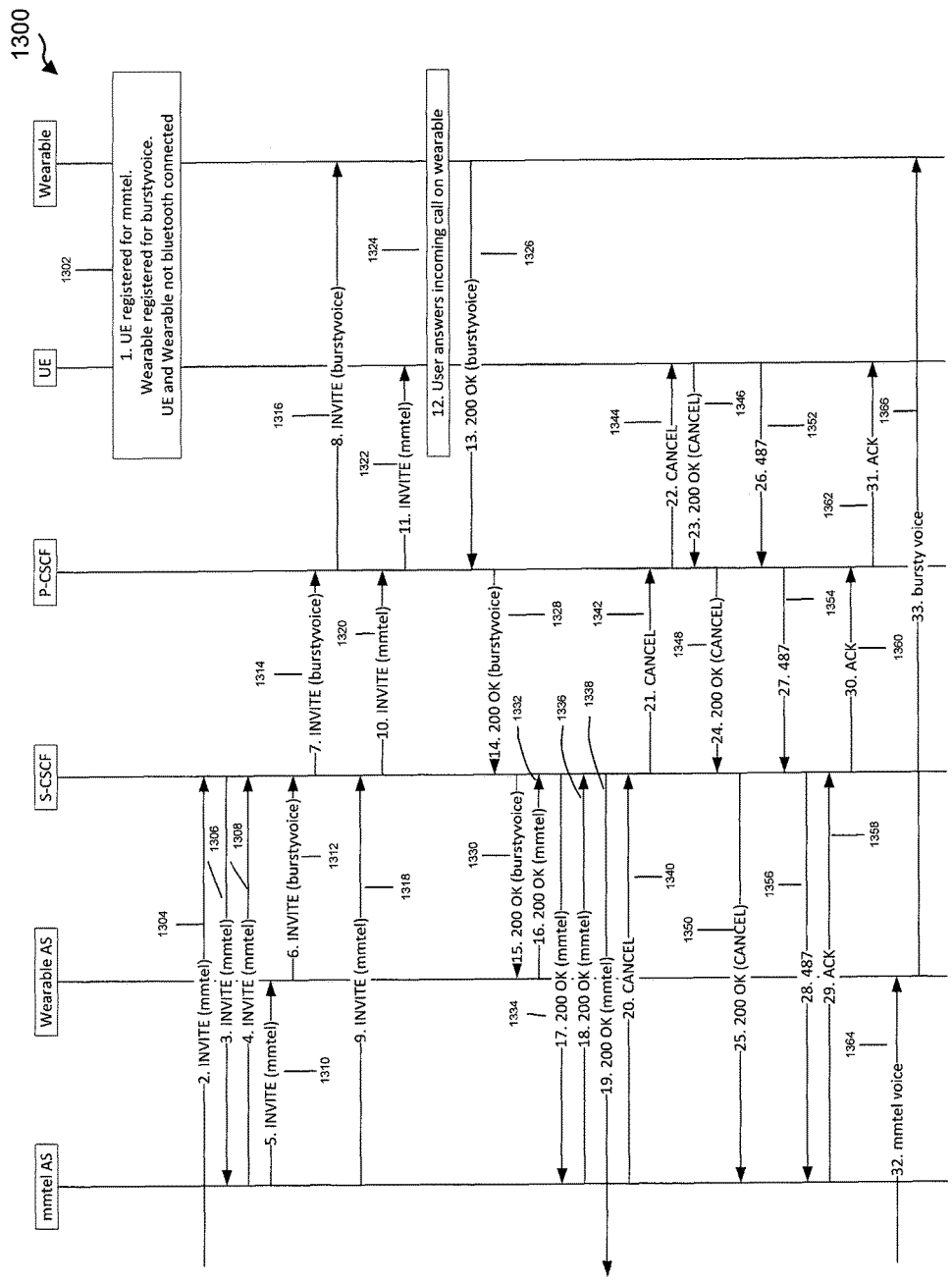
FIG. 13 is a block diagram illustrating an exemplary signaling flow for a MT call when a network operator supports bursty transmissions with the wearable device.

FIG. 12 illustrates an exemplary signaling flow 1200 for a MT call when a network operator supports bursty transmissions with a wearable device. FIG. 13 illustrates a detailed signaling flow 1300 for a MT call when a network operator supports bursty transmissions with the wearable device. The network may alert one or more of: a UE, the wearable device, or both, of a coming call. The alerts sent to both the UE and the wearable device may be sequential or in parallel. If only one device is alerted, the alerted device may inform the network of the other device being involved in the procedures. SIP signaling with the wearable device may follow normal SIP procedures. The network may interwork between normal voice and burstyvoice.

In FIG. 12, at block 1202, a UE is registered for MMTel services, and a wearable device is registered for burstyvoice services. The UE and wearable device are not Bluetooth connected. At 1204, a remote UE may send an invite for MMTel services to a MMTel AS. At 1206, the MMTel AS may send an invite for MMTel services to a wearable AS. At 1208, the wearable AS may send an invite for burstyvoice services to the wearable device. At 1210, the MMTel AS may send an invite for MMTel services to the UE. At block 1212, the user may answer an incoming call on the wearable device. At 1214, the wearable device may send a 200 message (OK message) to the wearable AS. At 1216, the wearable AS may send a 200 message (OK message) to the MMTel AS. At 1218, the MMTel AS may send a 200 message (OK message) to the remote UE. At 1220, the MMTel AS may cancel MMTel services with the UE.

In FIG. 13, blocks 1302 through 1366 further illustrate details for 1202 through 1220 among a wearable device, a UE, a P-CSCF, a S-CSCF, a wearable AS, and a MMTel AS.

Figure 14:
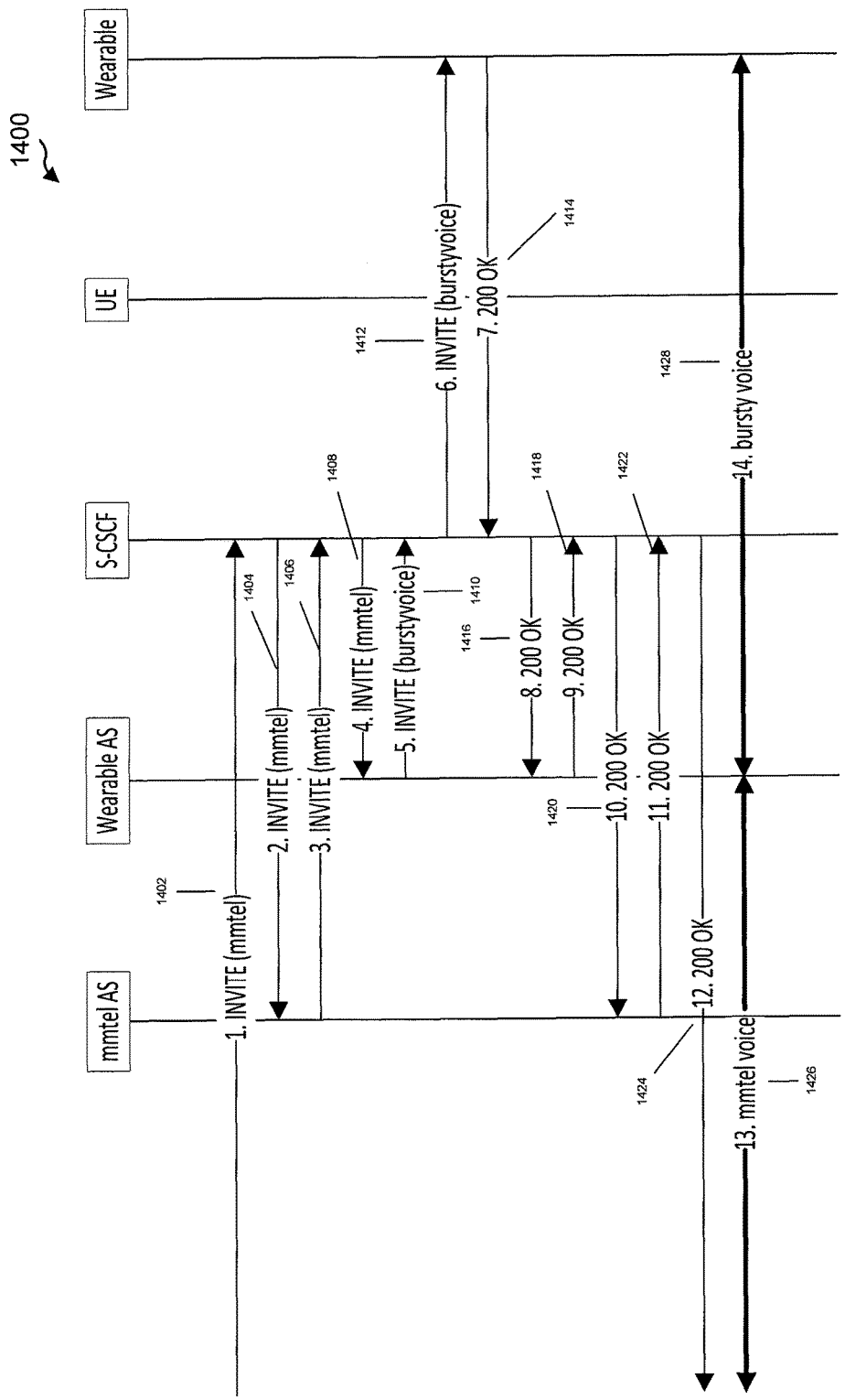

FIG. 14 illustrates an exemplary signaling flow 1400 for a MT call when a network operator does not support bursty transmissions with a wearable device, but allows connectivity to a third-party AS. In some aspect of the present disclosure, the network operator may route a call invite first to a MMTEL AS. In other aspect of the present disclosure, the network may route a call invite to a WAS prior to routing a call invite to the MMTel AS.

In FIG. 14, at 1402, a remote party may send an invite for MMTel services to a S-CSCF. At 1404, the S-CSCF may send an invite for MMTel services to a MMTel AS. At 1406, the MMTel AS may send an invite for MMTel services to the S-CSCF. At 1408, the S-CSCF may send an invite for MMTel services to a wearable AS. At 1410, the wearable AS may send an invite for burstyvoice services to the S-CSCF. At 1412, the S-CSCF may send an invite for burstyvoice services to a wearable device. In response, at 1414, the wearable device may send a 200 message (OK message) to the S-CSCF. At 1416, the S-CSCF may send a 200 message (OK message) to the wearable AS. At 1418, the wearable AS may send a 200 message (OK message) to the S-CSCF. At 1420, the S-CSCF may send a 200 message (OK message) to the MMTel AS. At 1422, the MMTel AS may send a 200 message (OK message) to the S-CSCF. At 1424, the S-CSCF may send a 200 message (OK message) to the remote party. At 1426, MMTel voice may be transmitted between the wearable AS and the remote party. At 1428, burstyvoice may be transmitted between the wearable AS and the wearable device.

A WAS and a wearable device may handle a MT call in several ways. For example, a wearable device may configure MMTel supplementary services to use CFU to a WAS. A normal MT invite may be forwarded to the WAS. Accordingly, the WAS may set up a burstyvoice call to the wearable device. In some aspects of the present disclosure, an IMS Core may not apply CFU for this call as it is not a MMTel call. As a further example, a wearable device may be allocated two MSISDNs (mobile station international subscriber directory numbers). One MSISDN may be allocated by an IMS operator. The other MSISDN may be allocated by a WAS. Calls to the number allocated by the WAS may be for burstyvoice transmissions. Such WAS may be included in the signaling path and media path. In some aspects of the present disclosure, a user may publish the number allocated by the WAS as a contact number.

Supplementary Services

Supplementary services may be handled in different ways under different situations, such as a network operator supporting bursty transmissions with a wearable device, a network operator not supporting bursty transmissions but supporting a third-party AS, and a network operator not supporting both bursty transmissions and a third-part AS. When a network operator supports burstyvoice transmissions, supplementary services may be handled using existing procedures, and further enhancements may not be necessary. When a network operator does not support bursty transmissions but supports a third-party AS, supplementary services may be handled using existing procedures, and further enhancements may not be necessary based upon some assumptions. The assumptions may include one or more of: a WAS being the first AS in the signaling path for a MO (Mobile Originated) call, a WAS being the last AS in the signaling path for a MT call, or a TAS being included in the signaling path for both MO and MT calls. When a network operator does not support both bursty transmissions and a third-party AS, a WAS may implement support for supplementary services. In some aspects of the present disclosure, a UE may provide the latest supplementary services configuration to the WAS. Accordingly, the wearable device may be able to receive signaling messages with a minimal delay even during a call.

Handling of Media at a Wearable Device

Figure 15:
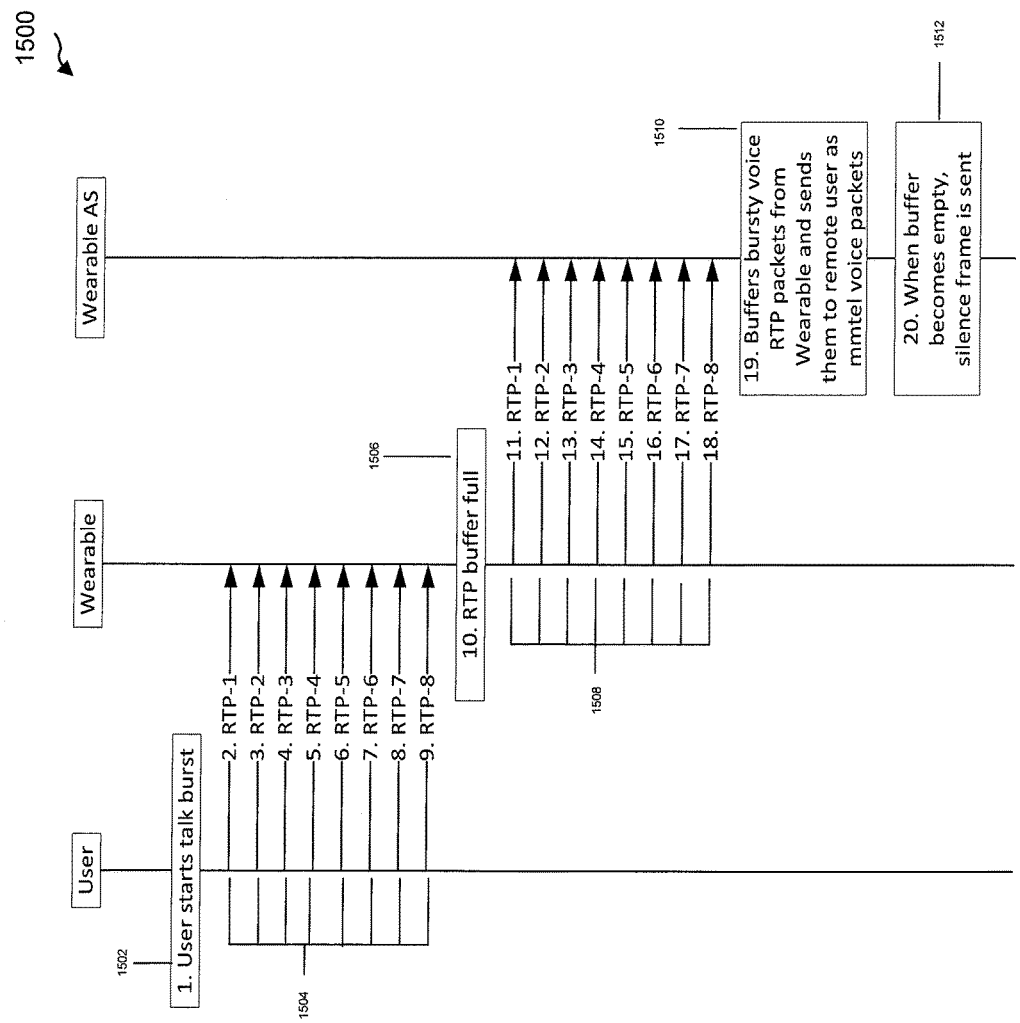
FIG. 15 is a block diagram illustrating an exemplary downlink media flow.
Figure 16:
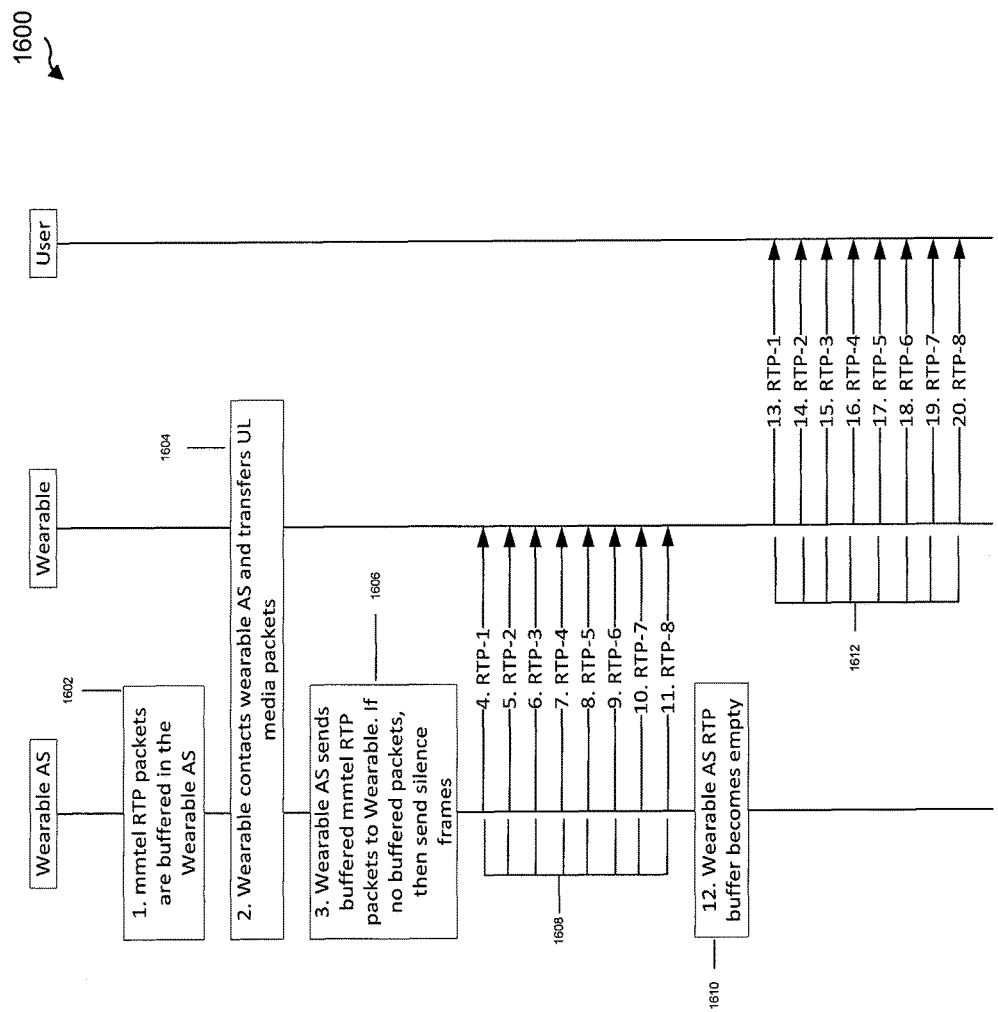
FIG. 16 is a block diagram illustrating an exemplary uplink media flow.

FIG. 15 illustrates an exemplary downlink media flow 1500. FIG. 16 illustrates an exemplary uplink media flow 1600. Media flow may include voice data, video data, both voice and video data, or the like. A voice call may be the same as a video call in terms of signaling. A wearable device may have limited capabilities. Accordingly, quality of video data may be reduced to match the limited capabilities of the wearable device.

In FIG. 15, at block 1502, a user starts talking in a burst. In response, at 1504, multiple RTP packets, for example RTP packets 1 to 8, may be received at a wearable device. At block 1506, RTP buffer of the wearable device may be full. Then, at 1508, the wearable device may start sending the received RTP packets 1 to 8 to a wearable AS. At block 1510, the wearable AS may buffer RTP packets 1 to 8 received from the wearable device, and may send these RTP packets 1 to 8 to a remote user as MMTel voice packets. At block 1512, when the buffer of the wearable AS becomes empty, the wearable AS may send one or more silence frames to the remote user.

In FIG. 16, at block 1602, MMTel RTP packets may be buffered in a wearable AS. At block 1604, a wearable device may contact the wearable AS and transfer uplink media packets to the wearable AS. At block 1606, the wearable AS may send buffered MMTel RTP packets to the wearable device. If no buffered RTP packets are to be sent, the wearable AS may send one or more silence frames to the wearable device. At 1608, the wearable AS may send multiple RTP packets, for example RTP packets 1 to 8, to the wearable device. At block 1610, the buffer of the wearable AS may become empty. At 1612, the wearable device may send the received RTP packets 1 to 8 to a user.

When a user starts talking, a wearable device may convert speech to one or more speech frames, and create and hold RTP packets. When a user stop talking, the wearable device may establish a data connection to a WAS. Then, the wearable device may transmit all or part of the buffered RTP packets using burst transmissions to the WAS. The wearable device may not send RTP packets at a constant rate, such as sending RTP packets every twenty/forty (20/40) milliseconds. Also, the wearable device may receive all or part of the downlink RTP packets buffered in the network, and play out the received RTP packets at an appropriate rate.

When the buffer of the UE is filled up, a wearable device may establish a data connection to a WAS. Then, the wearable device may transmit all or part of the buffered RTP packets using burst transmissions to the WAS, and receive all of part of the downlink RTP packets buffered in the network. In some aspects of the present disclosure, the WAS may be informed that this voice burst is not complete. When a user is silent for a certain amount of time (e.g., after a timer expires), a UE may indicate that there are no uplink packets. Also, the wearable device may receive all or part of the downlink RTP packets buffered in the network and play out all or part of the received speech to the user. In some aspects of the present disclosure, ROHC may be used.

A wearable device may maintain a buffer to store the RTP packets that encode user speech. Such contents in the buffer may constitute uplink traffic. The buffer may be filled up with user speech, and may be emptied when the buffer becomes full, or when a talk burst is completed. A wearable device may also maintain a buffer to store the RTP packets received from a remote party. Such contents in the buffer may constitute downlink traffic. Downlink traffic may be transmitted in bulk, or at a constant rate. The buffer may be filled up by the RTP packets received from the network, and may be emptied when a buffer becomes full, or when a talk burst is completed. In some aspects of the present disclosure, the buffer may be emptied at a constant rate, such as one RTP packet per twenty/forty (20/40) milliseconds.

A WAS may maintain one or more buffers. For example, a WAS may maintain two buffers. One buffer may buffer the RTP packets received from a wearable device. Contents of such a buffer may be sent to a remote UE. In some aspects of the present disclosure, this buffer may be emptied at a constant rate, such as one RTP packet per twenty/forty (20/40) milliseconds. In other aspects of the present disclosure, this buffer may be filled up at a variable rate. The other buffer may buffer the RTP packets received from a remote party. In some aspects of the present disclosure, such a buffer may be filled up at a constant rate, such as one RTP packet per 20/40 milliseconds. In other aspects of the present disclosure, the RTP packets in this buffer may be removed in bulk upon a wearable device establishing a data connection with the WAS.

A WAS may identify the start and end of a speech burst from a remote party. A speech burst may start upon a speech frame being received after a silence period. The silence period may start if the number of consecutive silence frames exceeds a pre-determined threshold (assuming the speech burst has ended). In some aspects of the present disclosure, the WAS may chunk received RTP packets into speech bursts. A WAS may provide a configurable number of RTP packets to a wearable device when the wearable device establishes a data connection with the WAS. All or part of the RTP packets may be transmitted to the wearable device. In some aspects of the present disclosure, the WAS may indicate to the wearable device the start and end of a speech burst while transmitting RTP packets.

A WAS may receive zero, one, or more RTP packets upon a wearable device establishing a data connection with the WAS. Each of the RTP packets may contain a speech frame, or a silence frame. A speech burst may start upon the WAS receiving a first speech frame after a silence period. The WAS may buffer the received RTP packets and group them into one or more speech bursts. After a speech burst is over, the WAS may stream the RTP packets belonging to that speech burst to a remote party at a constant rate, such as one RTP packet per twenty/forty (20/40) milliseconds. If the buffer becomes empty, the WAS may transmit one or more silence frames to the remote party. The WAS may expect a configurable number of RTP packets from the wearable device when the wearable device establishes a data connection to the WAS. All or part of the RTP may be received during such data connection. In some aspects of the present disclosure, the WAS may not expect to receive many consecutive silence frames from the wearable device.

In some aspects of the present disclosure, normal IMS procedures may be applied for a wearable device to end an ongoing call. In some aspects of the present disclosure, a wearable device may be CS voice capable for SRVCC (single radio voice call continuity), and no changes to existing procedures for the wearable device and network are necessary.

In some aspects of the present disclosure, no changes to an existing UE may be necessary if the network supports bursty transmissions. In other aspects of the present disclosure, a normal UE may be updated to establish a session with a wearable device using bursty transmissions if the network does not support bursty transmissions.

In some aspects of the present disclosure, a MMTel AS may be included in the signaling path. The MMTel AS may support mid-call supplementary services handled by a wearable device. Such support may be achieved by including a MMTel feature tag in MO or MT requests. In other aspects of the present disclosure, a WAS may adapt media between burstyvoice and normal voice if needed. For example, for a MO call, a WAS may be introduced in the media path based on an SDP answer. As a further example, for a MT call, a WAS may make sure that burstyvoice is in an SDP offer of invite.

Inter UE Transfer

A burstyvoice call may become a normal voice call by transferring the session from a wearable device to a UE. A normal voice call may become a burstyvoice call by transferring the session from a UE to a wearable device. Possible solutions may include gaining support from the network, as discussed in 3GPP TS 24.237, a call transfer mechanism, and an invite with a replace header sent by a target device. For the invite with a replace header, source and target device may or may not exchange session identification information through Bluetooth connectivity or another RAT.

Emergency Call

An emergency call may be an emergency call in a CS domain, a VoLTE emergency call, a burstyvoice emergency call, or the like. At least one of the location of a wearable device or the location of a UE may be identified and made available to the network to set up a burstyvoice emergency call. The burstyvoice emergency call may be routed to the closest PSAP based on the location of the UE.

Roaming/Other Considerations

Normal IMS roaming considerations may apply for a wearable device. When both MO and MT operators support burstyvoice, a media path may traverse both networks. Additional architectural work may be beneficial to optimize the media path.

Some QoS considerations may apply for a wearable device. For example, in some aspects of the present disclosure, burstyvoice traffic may not use certain bearers, such as QCI=1 bearer. Correspondingly, the network may not trigger such dedicated QC=1 bearer establishment when a session of burstyvoice is being established.

Device Configuration

A wearable device may be a LTE CAT 1 device with dual receive, LTE device with single receive, LTE CAT 0 device, a Rel-12 MTC (Multi-type Communication) device, a LTE CAT 3 device, a multimode device including 2G/3G and WiFi technologies, or a device with low cost and consuming low power. Services enabled on the device may include text, VoIP, and streamlining of low bit audio contents.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 3-15 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
    determining, by a wearable device, whether a network operator provides support for bursty communication in a wireless network operated by the network operator and accessible by the wearable device, wherein the support for bursty communication is either integrated into a telephony application server (TAS) or a wearable application server (WAS) that is a separate entity from the TAS and deployed between the TAS and the wearable device; and
    communicating, by the wearable device, directly through the wireless network operated by the network operator using the bursty communication in response to the determining the wireless network supports the bursty communication, wherein the communicating includes receiving packets in the bursty communication, buffering the received packets, and playing the bursty communication in its entirety after all of the packets in the bursty communication have been received.

2. The method of claim 1, wherein the communicating further includes receiving voice input from a user, buffering the received voice input, and transmitting the buffered voice input upon detection of silence of the user, or expiration of a bursty transmission.

3. The method of claim 1, further comprising communicating, by the wearable device, directly through the wireless network operated by the network operator using continuous communication.

4. The method of claim 1, wherein in response to the determining the wireless network does not support the bursty communication, further comprising:
    determining availability of a bridging wearable server supporting the bursty communication;
    establishing communications with the bridging wearable server; and
    communicating with the network operator through the bridging wearable server when the bridging wearable server is available.

5. The method of claim 4, wherein the establishing includes requesting, by the wearable device, the bridging wearable server to establish a call with one or more remote communication devices, wherein the one or more remote communication devices may include one or more user equipments or one or more other wearable devices.

6. The method of claim 5, wherein the bridging wearable server is in bursty or continuous communication with the one or more remote communication devices.

7. The method of claim 4, wherein the communicating with the network operator through the bridging wearable server includes one or more of:
    transmitting mobile originated voice data, by the wearable device, to the bridging wearable server; or
    receiving mobile terminated voice data, by the wearable device, from the bridging wearable server.

8. The method of claim 4, further comprising signaling, by the wearable device, configuration information to the network operator to use call forwarding to the bridging wearable server.

9. The method of claim 4, further comprising receiving allocation of a first mobile station international subscriber directory number (MSISDN) from the network operator and a second MSISDN from the bridging wearable server, wherein the network operator is an internet protocol multimedia subsystem operator.

10. The method of claim 9, further comprising publishing the second MSISDN as a contact number for the wearable device.

11. The method of claim 1, further comprising:
    receiving, at the wearable device, input for generating an emergency call; and
    transmitting location information regarding the wearable device to the network operator.

12. An apparatus configured for wireless communication, comprising:
    means for determining, by a wearable device, whether a network operator provides support for bursty communication in a wireless network operated by the network operator and accessible by the wearable device, wherein the support for bursty communication is either integrated into a telephony application server (TAS) or a wearable application server (WAS) that is a separate entity from the TAS and deployed between the TAS and the wearable device; and
    means for communicating, by the wearable device, directly through the wireless network operated by the network operator using the bursty communication in response to the determining the wireless network supports the bursty communication, wherein the means for communicating includes means for receiving packets in the bursty communication, means for buffering the received packets, and means for playing the bursty communication in its entirety after all of the packets in the bursty communication have been received.

13. The apparatus of claim 12, wherein the means for communicating further includes means for receiving voice input from a user, means for buffering the received voice input, and means for transmitting the buffered voice input upon detection of silence of the user, or expiration of a bursty transmission timer.

14. The apparatus of claim 12, further comprising means for communicating, by the wearable device, directly through the wireless network operated by the network operator using continuous communication.

15. The apparatus of claim 12, wherein in response to the determining the wireless network does not support the bursty communication, further comprising:
    means for determining availability of a bridging wearable server supporting the bursty communication;
    means for establishing communications with the bridging wearable server; and
    means for communicating with the network operator through the bridging wearable server when the bridging wearable server is available.

16. The apparatus of claim 15, wherein the means for establishing includes means for requesting, by the wearable device, the bridging wearable server to establish a call with one or more remote communication devices, wherein the one or more remote communication devices may include one or more user equipments or one or more other wearable devices.

17. The apparatus of claim 16, wherein the bridging wearable server is in bursty or continuous communication with the one or more remote communication devices.

18. The apparatus of claim 15, wherein the means for communicating with the network operator through the bridging wearable server includes one or more of:
    means for transmitting mobile originated voice data, by the wearable device, to the bridging wearable server; or
    means for receiving mobile terminated voice data, by the wearable device, from the bridging wearable server.

19. The apparatus of claim 15, further comprising means for signaling, by the wearable device, configuration information to the network operator to use call forwarding to the bridging wearable server.

20. The apparatus of claim 15, further comprising means for receiving allocation of a first mobile station international subscriber directory number (MSISDN) from the network operator and a second MSISDN from the bridging wearable server, wherein the network operator is an internet protocol multimedia subsystem operator.

21. The apparatus of claim 20, further comprising means for publishing the second MSISDN as a contact number for the wearable device.

22. The apparatus of claim 12, further comprising:
    means for receiving, at the wearable device, input for generating an emergency call; and
    means for transmitting location information regarding the wearable device to the network operator.

23. An apparatus configured for wireless communication, the apparatus comprising:
    at least one processor; and
    a memory coupled to the at least one processor,
    wherein the at least one processor is configured:
        to determine, by a wearable device, whether a network operator provides support for bursty communication in a wireless network operated by the network operator and accessible by the wearable device, wherein the support for bursty communication is either integrated into a telephony application server (TAS) or a wearable application server (WAS) that is a separate entity from the TAS and deployed between the TAS and the wearable device; and
        to communicate, by the wearable device, directly through the wireless network operated by the network operator using the bursty communication in response to the determining the wireless network supports the bursty communication, wherein the configuration of the at least one processor to communicate includes configuration to receive packets in the bursty communication, configuration to buffer the received packets, and configuration to play the bursty communication in its entirety after all of the packets in the bursty communication have been received.

24. The apparatus of claim 23, wherein in response to the determining the wireless network does not support the bursty communication, the at least one processor is further configured:
    to determine availability of a bridging wearable server supporting the bursty communication;
    to establish communications with the bridging wearable server; and
    to communicate with the network operator through the bridging wearable server when the bridging wearable server is available.

25. The apparatus of claim 24, wherein the configuration of the at least one processor to communicate with the network operator through the bridging wearable server includes one or more of:
    configuration to transmit mobile originated voice data, by the wearable device, to the bridging wearable server; or
    configuration to receive mobile terminated voice data, by the wearable device, from the bridging wearable server.

26. The apparatus of claim 24, wherein the at least one processor is further configured to signal, by the wearable device, configuration information to the network operator to use call forwarding to the bridging wearable server.

27. The apparatus of claim 23, wherein the configuration to communicate further includes configuration to receive voice input from a user, configuration to buffer the received voice input, and configuration to transmit the buffered voice input upon detection of silence of the user, or expiration of a bursty transmission timer.

28. A computer program product for wireless communication, the computer program product comprising:
    a non-transitory computer-readable medium having program code recorded thereon, the program code including:
    program code for determining, by a wearable device, whether a network operator provides support for bursty communication in a wireless network operated by the network operator and accessible by the wearable device, wherein the support for bursty communication is either integrated into a telephony application server (TAS) or a wearable application server (WAS) that is a separate entity from the TAS and deployed between the TAS and the wearable device; and
    program code for communicating, by the wearable device, directly through the wireless network operated by the network operator using the bursty communication in response to the determining the wireless network supports the bursty communication, wherein the program code for communicating includes program code for receiving packets in the bursty communication, program code for buffering the received packets, and program code for playing the bursty communication in its entirety after all of the packets in the bursty communication have been received.

29. The computer program product of claim 28, wherein in response to the determining the wireless network does not support the bursty communication, the program code further comprises:

program code for determining availability of a bridging wearable server supporting the bursty communication;

program code for establishing communications with the bridging wearable server; and program code for communicating with the network operator through the bridging wearable server when the bridging wearable server is available.

30. The computer program product of claim 28, wherein the program code for communicating further includes program code for receiving voice input from a user, program code for buffering the received voice input, and program code for transmitting the buffered voice input upon detection of silence of the user, or expiration of a bursty transmission timer.

* * * * *